United States Patent
Rodriguez Barros et al.

(10) Patent No.: US 8,963,701 B2
(45) Date of Patent: Feb. 24, 2015

(54) AUTOMOTIVE VEHICLE EARLY OPEN DOOR WARNING SYSTEM

(76) Inventors: Alejandro Rodriguez Barros, Mollet del Valles (ES); Jose Manuel Rodriguez Fernandez, Mollet del Valles (ES)

( * ) Notice: Subject to any disclaimer, the term of this patent is extended or adjusted under 35 U.S.C. 154(b) by 1036 days.

(21) Appl. No.: 12/672,772

(22) PCT Filed: Aug. 8, 2008

(86) PCT No.: PCT/ES2008/000553
§ 371 (c)(1),
(2), (4) Date: May 5, 2011

(87) PCT Pub. No.: WO2009/027565
PCT Pub. Date: Mar. 5, 2009

(65) Prior Publication Data
US 2011/0260848 A1 Oct. 27, 2011

(30) Foreign Application Priority Data
Aug. 9, 2007 (ES) .................................. 200702246

(51) Int. Cl.
*B60Q 1/00* (2006.01)
*B60Q 1/26* (2006.01)
*B60Q 1/32* (2006.01)

(52) U.S. Cl.
CPC .............. B60Q 1/2665 (2013.01); B60Q 1/323 (2013.01)
USPC ......................................... 340/438; 340/468

(58) Field of Classification Search
CPC .......... B60Q 9/008; G08G 1/16; B60K 35/00; B60K 37/02; B60W 50/00
USPC .............. 340/438, 468, 457, 425.5, 426, 473, 340/545, 430, 431, 568, 693, 321, 541, 463, 340/471; 307/49.1, 10.1, 9.1
See application file for complete search history.

(56) References Cited

U.S. PATENT DOCUMENTS

| | | | |
|---|---|---|---|
| 2,761,121 A | | 8/1956 | Caporale |
| 4,494,012 A | * | 1/1985 | Coker ....................... 307/132 E |
| 4,965,546 A | | 10/1990 | Chang |
| 4,972,173 A | | 11/1990 | Raciti |

(Continued)

FOREIGN PATENT DOCUMENTS

| | | | |
|---|---|---|---|
| DE | 195 37 619 A1 | | 4/1997 |
| DE | 19537619 | * | 4/1997 |

(Continued)

OTHER PUBLICATIONS

International Search Report for PCT Application No. PCT/ES2008/000553 mailed Jan. 19, 2009.

*Primary Examiner* — Brian Zimmerman
*Assistant Examiner* — Thomas McCormack
(74) *Attorney, Agent, or Firm* — RatnerPrestia

(57) ABSTRACT

The invention relates to an automotive vehicle early open door warning system, including a first light device arranged in a first external area of a side of the vehicle, for emitting a warning light signal, prior to the opening of a door, a second light device arranged in a second area of the side of the vehicle spaced from the first area for emitting a warning light signal, and an electronic controller circuit in connection with the light devices, for controlling the first light device so that it emits the warning light signal prior to the opening of the door and the second light device so that it emits the warning light signal prior to or during the opening of the door.

18 Claims, 12 Drawing Sheets

(56) References Cited

U.S. PATENT DOCUMENTS

| | | | |
|---|---|---|---|
| 4,983,947 A * | 1/1991 | Mullen et al. | 340/426.28 |
| 5,121,098 A * | 6/1992 | Chen | 340/457 |
| 5,828,299 A * | 10/1998 | Chen | 340/468 |
| 7,008,089 B1 * | 3/2006 | McCloy et al. | 362/494 |
| 7,068,160 B2 | 6/2006 | Tourneur et al. | |
| 7,876,203 B2 * | 1/2011 | Traylor et al. | 340/435 |
| 2004/0114384 A1 * | 6/2004 | Carter et al. | 362/494 |
| 2005/0231337 A1 * | 10/2005 | Tourneur et al. | 340/426.28 |

FOREIGN PATENT DOCUMENTS

| | | |
|---|---|---|
| DE | 199 08 734 C1 | 11/2000 |
| GB | 1 506 107 | 4/1978 |
| GB | 2 048 541 A | 12/1980 |

* cited by examiner

Fig. 4 (AA)

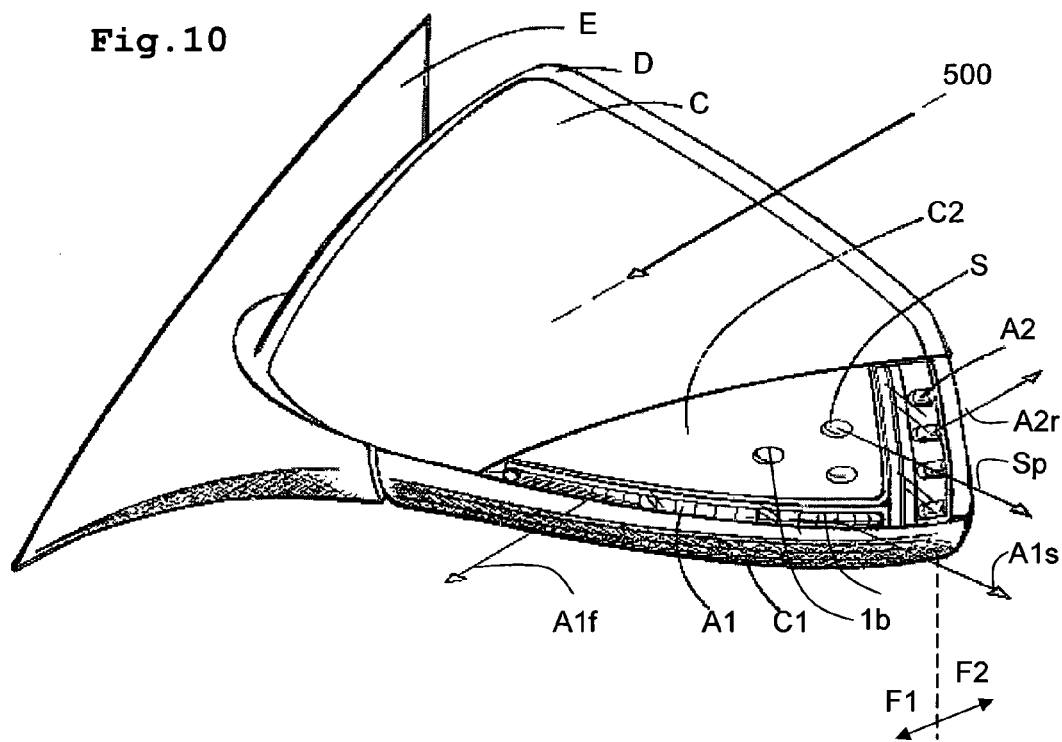
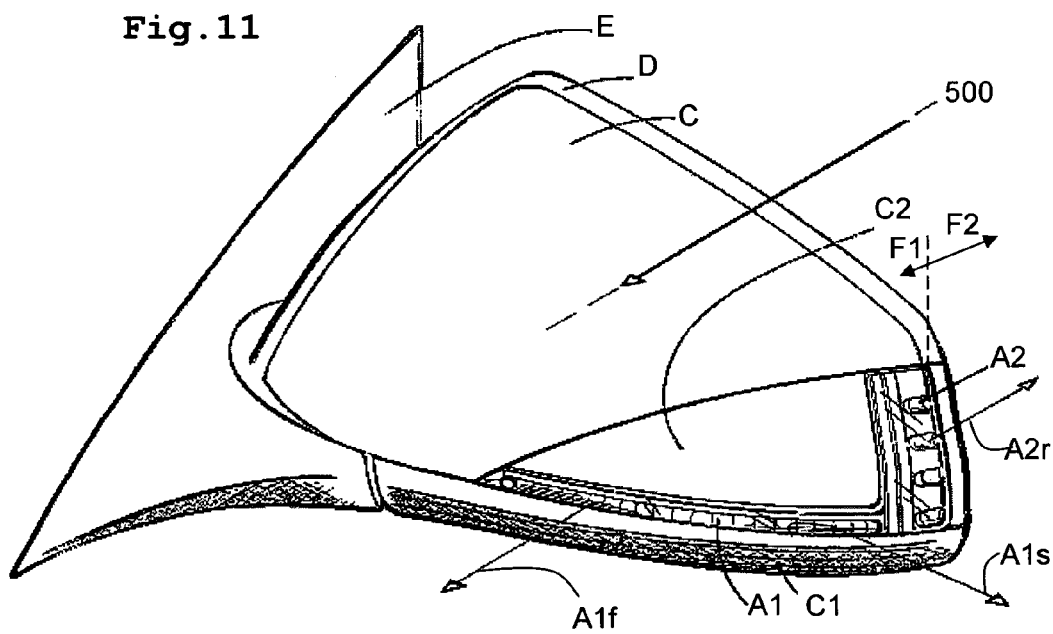

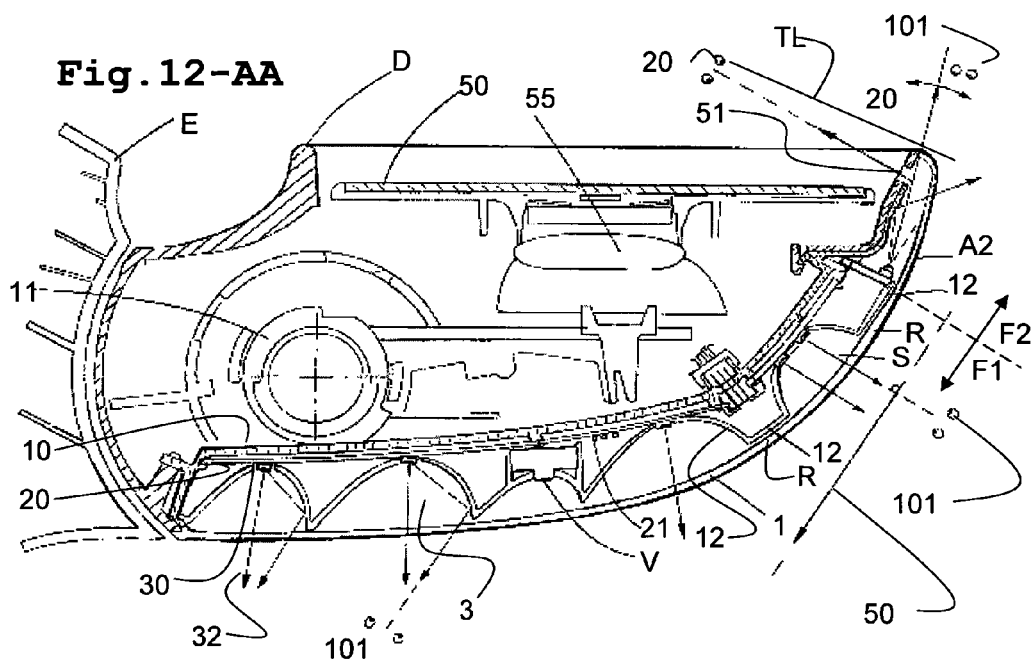
Fig.12-AA
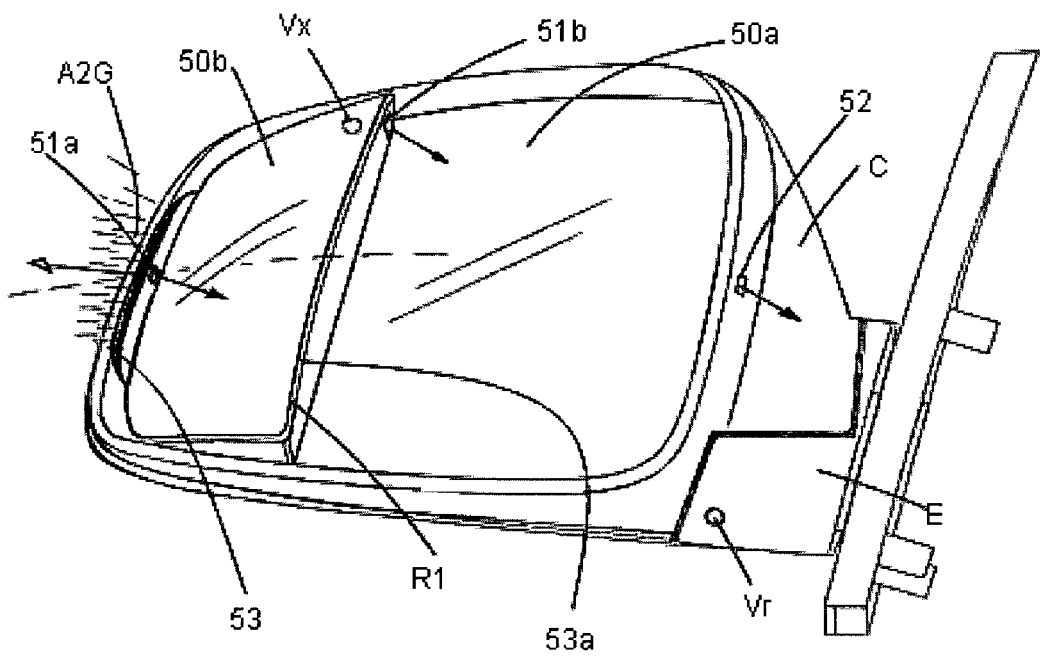
Fig.13

AUTOMOTIVE VEHICLE EARLY OPEN DOOR WARNING SYSTEM

This application is a U.S. National Phase Application of PCT International Application No. PCT/ES2008/000553, filed Aug. 8, 2008.

FIELD OF THE ART

The purpose of the present invention is to prevent external collisions of pedestrians or vehicles with an automotive vehicle door when it is opened from outside or inside of said vehicle, and it generally relates to an early open door warning system by means of the emission of a warning light signal by a light device, and particularly to a warning system comprising a second warning light device associated with the first one to emit another light signal prior to or during the opening of said door.

PRIOR STATE OF THE ART

Different automotive vehicle open door warning systems are known, some of which provide said warning when they detect by means of detecting devices that a door has been opened, and others provide said warning when they detect that a user touches and moves a handle of said automotive vehicle, in the action of opening same.

U.S. Pat. No. 7,068,160 discloses one of such open door warning systems which provide said warning when they detect by means of detecting devices that a door has been opened. In said system, one or more external lights and optionally an internal light are activated when the detecting devices detect the opening of at least one of the vehicle doors, also when it is detected that the vehicle speed is below a pre-selected threshold, that the transmission gear ratio introduced in the gear box corresponds to a parking or neutral position, and that neither the brake nor the blinker of the vehicle are activated.

Said U.S. Pat. No. 7,068,160 neither teaches nor suggests the use of the system therein proposed as an early open door warning system.

In addition, U.S. Pat. No. 5,828,299 relates to one of such open door warning systems, particularly a warning system that is activated when a handle of the vehicle is touched and moved. The system described in said patent includes switches in the handles of the door (both the interior and the exterior handles) and a warning device with a light device to emit a flashing light, for example. The location of the warning device is not claimed, and in the patent specification provides a very generic definition of its location, indicating that it is assembled in a highly visible position inside or outside the vehicle. In addition, although said U.S. Pat. No. 5,828,299 proposes using either a lamp or a series of light emitting diodes, or LEDs, for each door as the light device, it does not propose arranging said LEDs separated in different locations spaced along the side of the vehicle for the purpose of emitting light from two well differentiated areas since the LEDs proposed therein are arranged very close to one another on one and the same support constituting the mentioned warning device.

Said U.S. Pat. No. 5,828,299 proposes that each of the vehicle doors can be separately connected to one of said warning systems, with its respective switches and light emitting warning devices, the systems of all the doors sharing only one common power supply, some of the elements of said system, for one embodiment, being self-adhesive to be used as accessories.

SUMMARY OF THE INVENTION

It seems necessary to offer an alternative to the state of the art which covers the gaps therein by means of providing an automotive vehicle open door warning system that is more complete and advantageous than conventional systems (such as that described in U.S. Pat. No. 5,828,299), the use of which allows the early warning for a pedestrian, cyclist or vehicle that is found or traveling adjacent to the door that is to be opened, to be more effective as it emits light from at least two different points spaced out along the side of the automotive vehicle, and said warning is emitted with soon enough so as to have effective reaction time, such that it allows being visible before and during the opening of said door from outside the vehicle, thus offering more assurances that the light warning is seen by the person traveling adjacent to the side of the automotive vehicle where the door that is to be opened is located.

To that end, the present invention provides an automotive vehicle early open door warning system to prevent external collisions with said door or with protruding parts of the vehicle by pedestrians or vehicles traveling in a dangerous passageway parallel to the axis of travel of the vehicle or side area at risk adjacent to said side of the automotive vehicle, when the latter travels at low speed below a pre-set threshold, or it is reducing speed such that it is almost stopped, or it is stopped with or without the engine running and with or without the side mirrors folded, comprising:

a first light device arranged in a first external area of a side with respect to a vertical longitudinal mid-plane of said automotive vehicle for emitting at least one warning light signal, prior to the opening of a door of said side, visible from at least eye points located in a passageway or side area adjacent to said side of the automotive vehicle, when said door is closed, a first sensor-detector-switch associated with an operating element (such as an interior or exterior handle, a button, a switch, or a combination thereof) used to open said door, said first sensor-detector-switch being suitable for detecting when said operating element is operated at least in an initial phase prior to unlocking the car door lock or catch, and supplying a corresponding electric signal or closing a contact, and an electronic controller circuit in connection with said first sensor-detector-switch and with said first light device, said electronic controller circuit being suitable for controlling the first light device so that it emits said warning light signal when the first detecting device detects said operation of said operating element.

Unlike the conventional proposals, the system proposed by the invention comprises, in connection with the same electronic controller circuit controlling the first light device, at least one second light device arranged in a second area of said side of said automotive vehicle spaced from said first area for emitting a warning light signal visible from at least said eye points located in said passageway, the electronic controller circuit being suitable for controlling, in addition to the first light device, also said second light device so that it emits said warning light signal prior to or during the opening of said door.

For a preferred embodiment, said warning light signal emitted by said first light device is visible from rear eye points located in said passageway.

For a preferred embodiment, said warning light signals are periodic signals with respective predetermined on and off frequencies.

Said first external area of said side of the automotive vehicle generally forms part of an external side mirror assembly or of the associated support thereof which connects it to the bodywork, the first light device being installed such that it emits light at least towards the rear, using as a reference the normal traveling direction of the automotive vehicle.

For one embodiment, the electronic controller circuit and/or the first light device are suited so that when the door is closed and said operating element is not operated, the first light device emits a periodic light signal indicating intention to turn, or turn signal, when a blinker function activating device of the vehicle is operated by the driver to indicate said intention to turn.

Said emission of the turn signal by the first light device can be carried out either because the electronic controller circuit controls it for such purpose or because the first light device works in association with the general circuit of the vehicle producing the turn signal, or is part of a network of controllers of said vehicle producing the signals.

As previously mentioned, the electronic controller circuit is suitable for controlling the second light device so that it emits the warning light signal prior to or during the opening of said door.

In the event that the second light device is made to emit during the opening of said door, the proposed system comprises a second detecting device in connection with the electronic controller circuit arranged in the automotive vehicle for detecting the opening of said door, the electronic controller circuit being suitable for making the second light device start to emit the warning light signal when the second detecting device detects the opening of the door.

As for the event that the second light device is made to emit prior to the opening of the door, to that end the electronic controller circuit is suitable for controlling the second light device so that it emits the warning light signal prior to the opening of the door when the first detecting device detects said operation of the operating element, preferably in said initial phase prior to unlocking the door lock.

For several embodiments, the second light device is arranged in a second area which does not include an external side mirror assembly or the associated support thereof.

In some variants of said embodiments, said warning light signal emitted by said second light device is only visible when the door is not completely closed.

Such is the case of the preferred embodiment for which the second area forms part of an edge of the door and is visible from behind, together with the warning light signal emitted by the second light device, when the door is open within a determined range of angular positions, which includes the positions of the door when the latter blocks vision from behind of the light signal emitted towards the rear by the first light device.

For said embodiment, the second light device is arranged on said edge of the door such that it is not accessible from outside when the door is closed.

Said embodiment is considered to be very important because it solves a problem which causes many accidental collisions against the door by cyclists traveling adjacent thereto who do not notice that it is being opened until it is too late. Said problem occurs when the vehicle door is half-open, to the point that it blocks vision from behind of the light signal emitted by the first device before, for example, a cyclist has noticed the warning light signal emitted by the first device, either because the door was opened very quickly, with very little time passing between the time that the occupant of the vehicle has touched the handle (which activates the first light device) and the time that he/she has started to open the door, or for any other reason, such as the fact that the cyclist was not paying enough attention.

When said situation of blocking the first light device occurs because the door is half-open, the person traveling adjacent to the side of the vehicle of which said door forms part, for example said cyclist, can see the edge of the door, so the arrangement of the second light device on said edge is very useful for, in this case, replacing the first light device in its function when its light signal is blocked by the door, giving the cyclist a second chance to notice the open door warning by means of the emission of the warning light signal emitted by the second light device.

For another embodiment, the second area is an internal area of the door and is visible from behind, together with the warning light signal emitted by the second light device, when the door is open within a determined range of angular positions, which includes the positions of the door when the latter blocks vision from behind of the light signal emitted towards the rear by the first light device.

In another embodiment, said second area forms part of the internal panel of the door or of the interior handle and allows vision from behind (at least from said eye points located in said passageway or side area adjacent to the side of the automotive vehicle) of the warning light signal emitted by the second light device when said door is open in any opening position.

For another embodiment, the second area in which the second light device is arranged is an external area of the side of the automotive vehicle or forms part of an element arranged in said external area of the side of the vehicle (such as in an exterior handle or close to same), and allows vision from behind of the warning light signal emitted by the second light device.

For one embodiment, the proposed system comprises at least one additional light device in connection with the electronic controller circuit, which is arranged in an external region of the side of the automotive vehicle, said electronic controller circuit being suitable for controlling said additional light device so that it emits a warning light signal, prior to or during the opening of the door, visible from the front and/or the side of said vehicle.

The purpose of the light signal emitted by said additional light device being visible from the front is to alert people traveling adjacent to the side of the vehicle, but from the front, i.e., in the direction opposite to the traveling direction of the cyclist mentioned when describing the previous embodiments.

For one embodiment, the warning light signal emitted by the first light device also is visible from the front, such that said person traveling from the front of the automotive vehicle has the possibility of seeing both warning light signals, the one emitted by the first light device and the one emitted by the additional light device.

With respect to said external region of the side of the automotive vehicle in which the additional light device is arranged, for a preferred embodiment such region forms part of an external side mirror assembly or of the associated support thereof which connects it to the bodywork.

The electronic controller circuit is preferably suitable for controlling the additional light device so that it emits said warning light signal prior to the opening of the door when the first detecting device detects the operation of the operating element, although for another embodiment it is also possible to control the additional light device or all the signal devices associated with the system according to the second sensing-detecting-switch device which is operated within a range between the door barely open, passing through the different positions thereof until it is fully open.

For one embodiment, the first light device of said first area, the second light device of said second area and the other light devices associated with the system and with the electronic controller circuit, are operated with a sensing-detecting device which is operated within a range between the door barely open, passing through the different positions thereof until it is fully open, outside the sensing-detecting group located in the exterior or interior handles or in the door lock system.

For one embodiment, the electronic controller circuit, or other associated controller, is suitable for controlling the additional light device and/or the second light device so that it emits a light signal towards the front and/or the side with a different function from that of an open door warning (such as lighting and/or locating function) when the door is closed and the operating element is not operated For one embodiment, the electronic controller circuit is suitable for controlling the additional light device and/or the second light device so that it will cease to emit said light signal with said different function from that of an open door warning when the first sensor-detector-switch detects said operation of the operating element.

For one embodiment, the electronic controller circuit, or another associated controller, is suitable for controlling the additional light device and/or the second light device so that it starts to emit said light signal with a different function from that of an open door warning automatically when the engine of said vehicle is started or when said vehicle starts to move.

According to one embodiment, the electronic controller circuit, or other associated controller, is suitable for controlling the additional light device and/or the second light device so that it emits said light signal with a different function from that of an open door warning, reducing its light intensity electronically and automatically when the remaining lights of said vehicle are turned on for night travel.

The electronic controller circuit is preferably suitable for controlling the first and/or the second light devices and/or the additional light device so that they emit their respective periodic warning light signals with a frequency different from the periodic light signal indicating intention to turn, or turn signal.

Although the description of the present invention has been carried out for a single door and a side of the vehicle, the proposed system also comprises other light devices on the other side of the automotive vehicle in connection with the electronic controller circuit and with an operation similar to that of said first and/or second light devices and/or said additional light device, as well as other first and second detecting devices associated with each of the doors of the automotive vehicle for, respectively, detecting their opening in an early manner or when the opening has started to occur, from a range of barely open until it is fully open.

The internal point of view of the occupants of the vehicle by means of the present invention is also taken into consideration, for the purpose of allowing them to have an aid and a guide for conditioning their conduct when opening the door and getting out or getting into the vehicle by means of sound stimuli and complementary visual locater lights which aid and remind them to look behind them, to calmly locate the elements which must be used, to look or touch and to know the state locks (unlocked-locked), whether or not the system is prepared to operate, whether the doors are closed correctly and following a logical order for acting step-by-step and making the right decision when opening said door.

As a visual locater when initiating the process, i.e., when operating the operating device (for example the interior handle), the use of at least one small operating light indicator of at least one color, located in the interior handle or in its adjacent structure easily indicating where it is located in the internal panel of the door and when the lock is unlocked, and/or associated with another similar locating light easily visible by the driver or passengers in the knob of the gear shift lever, in the vicinity, in the internal rear-view mirror or in the support thereof or in any part of the interior visible by the driver, is contemplated.

Said sound locaters or the light devices located in the door, in the handles or in the side mirror, allow knowing from outside or inside the vehicle by means of the second sensor that is activated when the door is barely open, that said door or any vehicle door is correctly closed independently of the early open door warning.

The light signals or light devices comprised in the proposed system by the invention have, for some embodiments, other uses, such as that of turn light, that of front position light, that of side position light or that of rear position light, or that of presence lights for traveling during the day, so they are given a second use by means of using the described electronic controller circuit, which changes its periodic on-off frequency.

As previously mentioned, the location of the first light device is, for a preferred embodiment, that which is comprised in an external side mirror assembly, or by default, a rear-view element or camera, or in its support structure. Such location is preferred because it takes advantage of its projecting position relating to the doors.

For other embodiments, said location of the first light device is in a part of the bodywork relating to said side of the vehicle, either the front or rear, such that the light signal or signals emitted thereby are visible from the front and from behind by vehicles traveling in the previously described adjacent passageway.

Said passageway has a width such that an open door of the vehicle can interfere with someone traveling in it and said emitted light signals can transmit a clear notion of the range, dimension and location of said open door or said door which is going to be opened.

With regard to the electronic controller circuit, for a preferred embodiment, it is based on a microprocessor which synchronizes and commands programmed and programmable actions. The system has communication devices by means of microphones, or data inputs such as USB or encoded radio frequency or with a Wi-Fi-type language for recording data in memory. The proposed system also comprises as an aid for its main operation as an open door warning, of at least one sensor of any type: IR or radio frequency emitters-receivers, laser scanning sensors, radio wave reflection, radars or video cameras associated with software which analyzes the intrusion of vehicles in said passageway with the danger of collision or hitting something/someone, and it also contemplates the automatic intercommunication with other vehicles in its environment by a direct or satellite radio frequency system for the purpose of establishing communication by signs or signals of the intention to open the door to respond to said detections, delaying, blocking the opening of the door, or receiving a warning.

For one embodiment, one of said sensors is an end sensor in the form of a camera or image capture device forming part of a suitable supervision system for the detection of the presence of objects that can collide with the mentioned vehicle, in a determined external surveillance area, covering at least one blind spot.

For one embodiment, the camera or capture device is arranged behind a window defined in the plate glass of the plate glass assembly of the side mirror assembly or adjacent thereto.

Said external surveillance area is a reduced area comprising a part of the adjacent passageway up to a limit distance located behind the vehicle but close to same, said distance generally being five meters at most.

By connecting the mentioned supervision system, and specifically the activation thereof, to the early open door warning system proposed by the invention, the efficiency thereof is improved in comparison with conventional systems, because it will only start operating when the intention to open a door has been detected, and for monitoring a small area, whereby the processing capacity of such system can be less than that of conventional systems which need to analyze a large amount of data since the areas to be monitored are larger and since the analysis is not limited to an early open door warning. The energy savings of the supervision system connected to the system proposed by the invention is also evident.

The stimuli provided by the light signals described are completed with internal and external acoustic signals associated in operation with the electronic controller circuit and indicating lights of the system. Said signals or stimuli can be spoken with the possibility of being modified at the discretion of the interested party so that they are not annoying, without varying the objectiveness of the signal or message emitted.

BRIEF DESCRIPTION OF THE DRAWINGS

The foregoing and other advantages and features will be better understood from the following detailed description of several embodiments in reference to the attached drawings, which must be considered by way of non-limiting illustration, understanding that a person skilled in the art can obtain a product within the concept of the present invention based on such drawings by associating or relating elements.

In the attached drawings.

Figure 5:
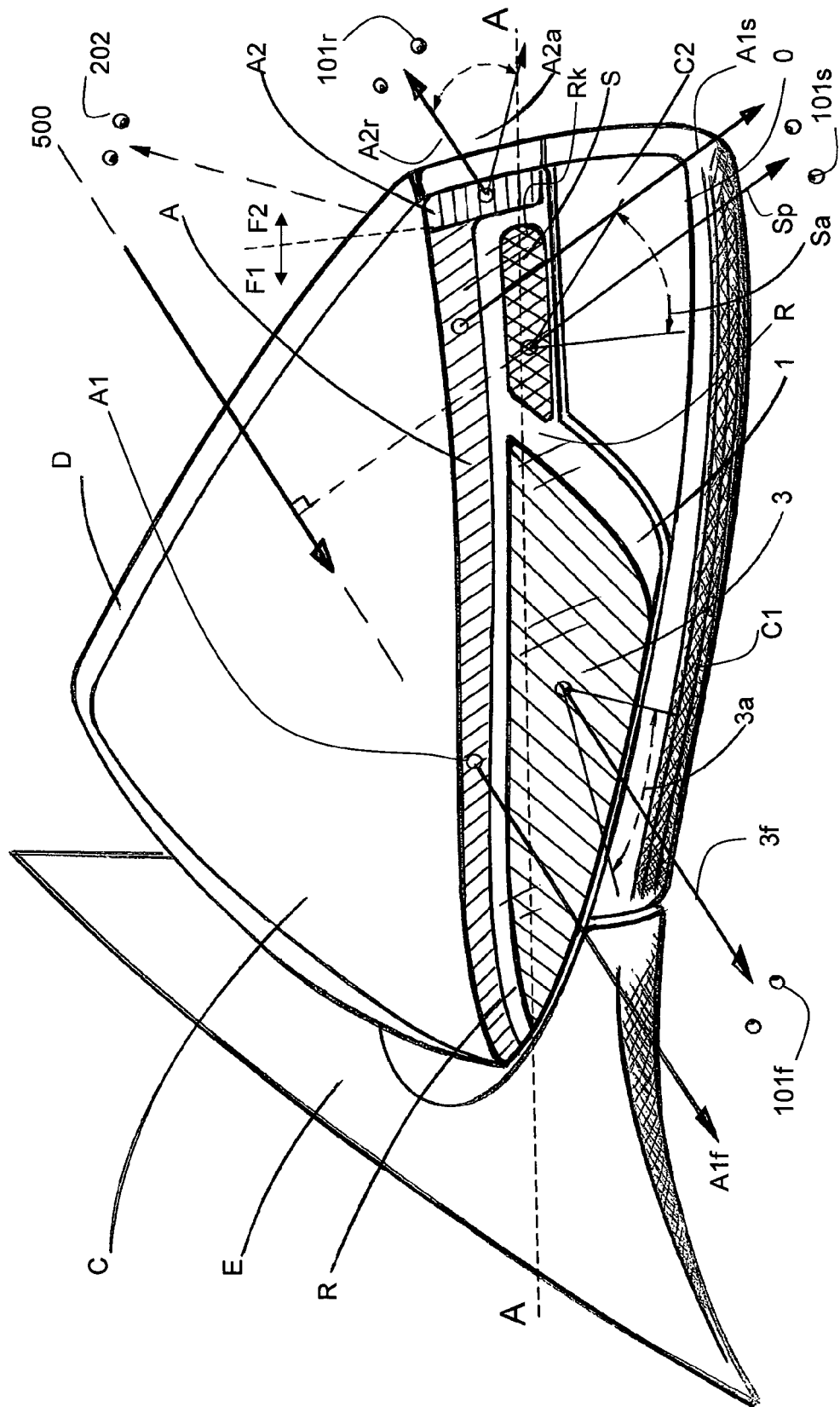
FIG. 5 is a perspective view of a side mirror with three external signals associated with the system, which are.
Figure 6:
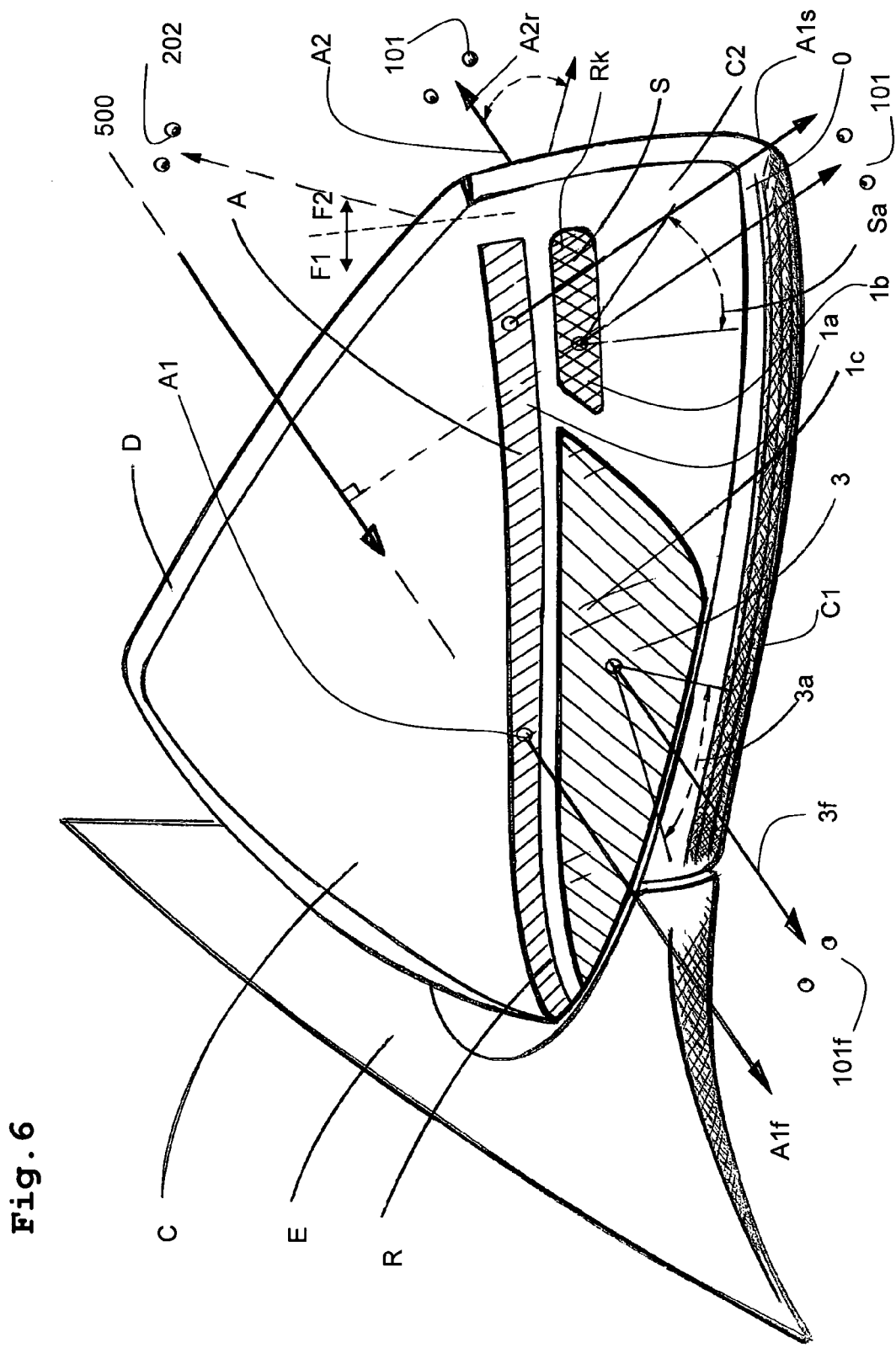
Figure 7:
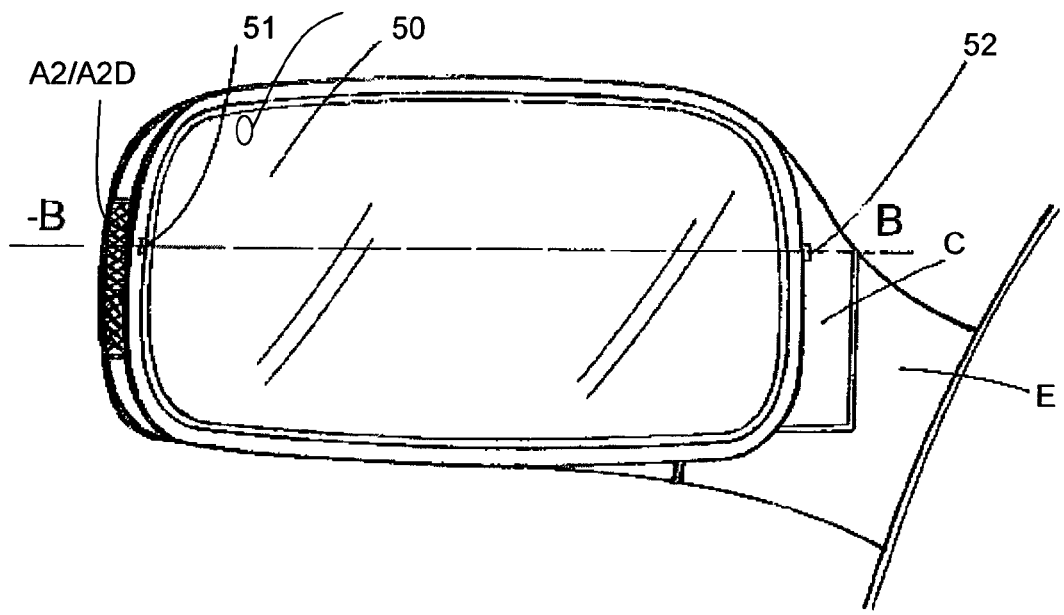
Figure 8:
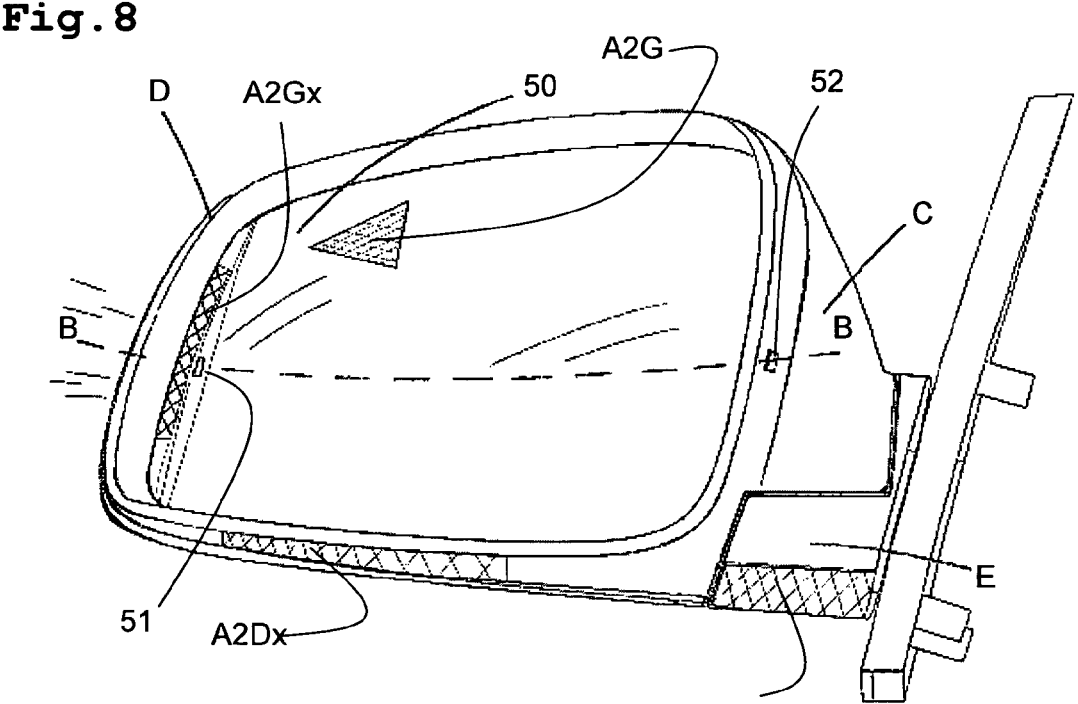
Figure 9:
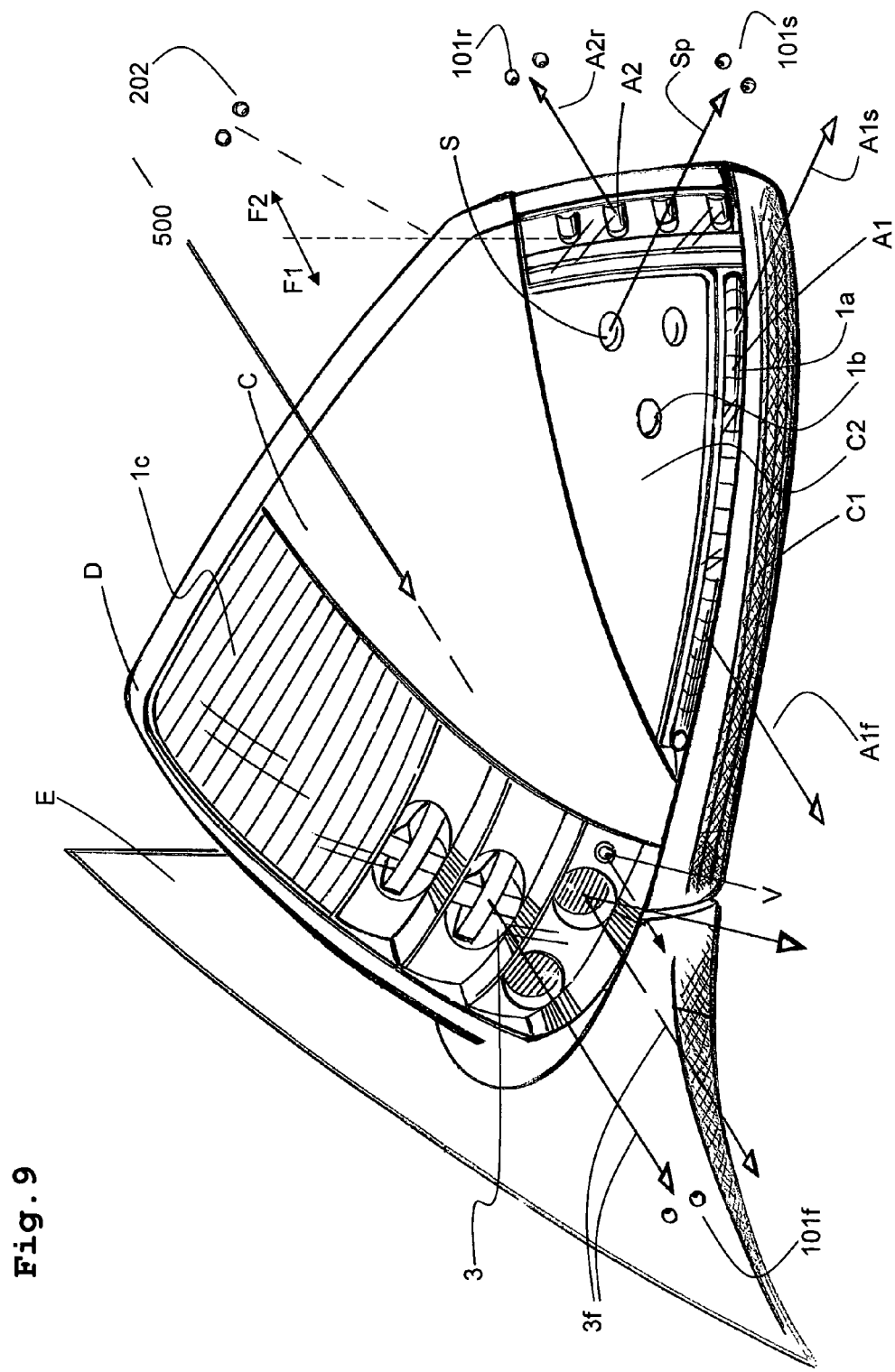

the one emitted by the first light device D1, or turn signal A formed by A1 and A2;

the one emitted by the third light device D3, or front location signal 3; and in an alternative or complement, the one emitted by another third device D3, or side location signal S integrated under a single shade 1;

said FIG. 5 also shows the separating areas R between the cavities thereof and the horizontal angles of light emission of said signals, towards the rear A2a, towards the front 3a and towards the side Sa are observed;

FIG. 6 is a perspective view like that of FIG. 5, but for another embodiment for which the side mirror illustrated has said three external signals independent from one another, with the part of the turn signal towards the rear A2 in a module separated from the front part A1 or with an outlet window separated from the outlet window of A1, located in any part that is visible from behind, in the frame D of said side mirror, in the plate glass 50 or in the support E thereof;

FIG. 7 is a front view of a side mirror according to FIG. 5 with its turn signal emitting towards the rear A2, or A2D in the frame D or in the casing C, and a complementary light outlet of the same signal A2 that is visible by the driver and as a locater of the perimeter of the plate glass 51;

FIG. 8 is a view from behind from the eye points of the driver 202 of the side mirror of FIG. 6, which shows a window 51 as a locater of the plate glass or alternatively, a locater light in the external frame 52, and different possible light outlets towards the rear of the blinker in its part A2 are observed, which are:

A2Gx on the edge of the plate glass 50;

A2G under the plate glass or included in said plate glass 50 or in a part thereof;

A2Dx in the lower part of said side mirror in a plane that is under the plate glass 50; and A2E in the support E of said side mirror attaching it to the bodywork;

FIG. 9 is a perspective view of a side mirror with three associated devices joined together, forming assemblies with the external covers C, C2 containing them with the assembly;

FIG. 10 is a perspective view of a side mirror without the front signal 3, in this case the cover C replacing the cover C+signal 3 assembly of FIG. 9;

FIG. 11 is a perspective view of a side mirror like that of FIG. 10 but without the side signal S, in this case the cover C2 replacing the cover C2+signal S assembly; the side mirror illustrated in FIG. 11 is a basic side mirror for the open door warning system only with the turn signal A1+A2 emitted by the first light device D1 of the system;

FIG. 12 is a horizontal cross-section AA of the side mirror of FIG. 5 showing some constructive details of the inside of said side mirror, the internal chassis 11, the actuator of the plate glass 55, and the interface of the light device with several cavities and functions; the function—cavity 3 or light towards the front, the cavity S or light towards the side, the light outlet A-2 or light towards the rear close to the frame D, the separation between these cavities formed by the combination between the internal reflector 12 and the shade 1 of said device forming the areas without light R; the components of the light source, the LEDs 30 with their light emission focal axis 32, the support circuit 20, the protective circuit 21, and the tangential line TL where the eyes of the driver 202 can indirectly see part of the signal directed towards the rear in the direction of the eye points 101r which are in the dangerous passageway, or said eyes of the driver 202 can see the light of the signal by a locater or window in the frame D which is the hole 51 and it allows the passage of part of the light of the signal, stand out. The light area 100 is also distinguished from the shaded area 200.

FIG. 13 is a perspective view of a side mirror with its plate glass assembly formed by two pieces of plate glass 50a and 50b at different levels and with different inclinations, when one of said pieces of plate glass can be an additional plate glass, which allows locating thereunder light signal elements or video cameras, or system aid sensors.

Figure 14:
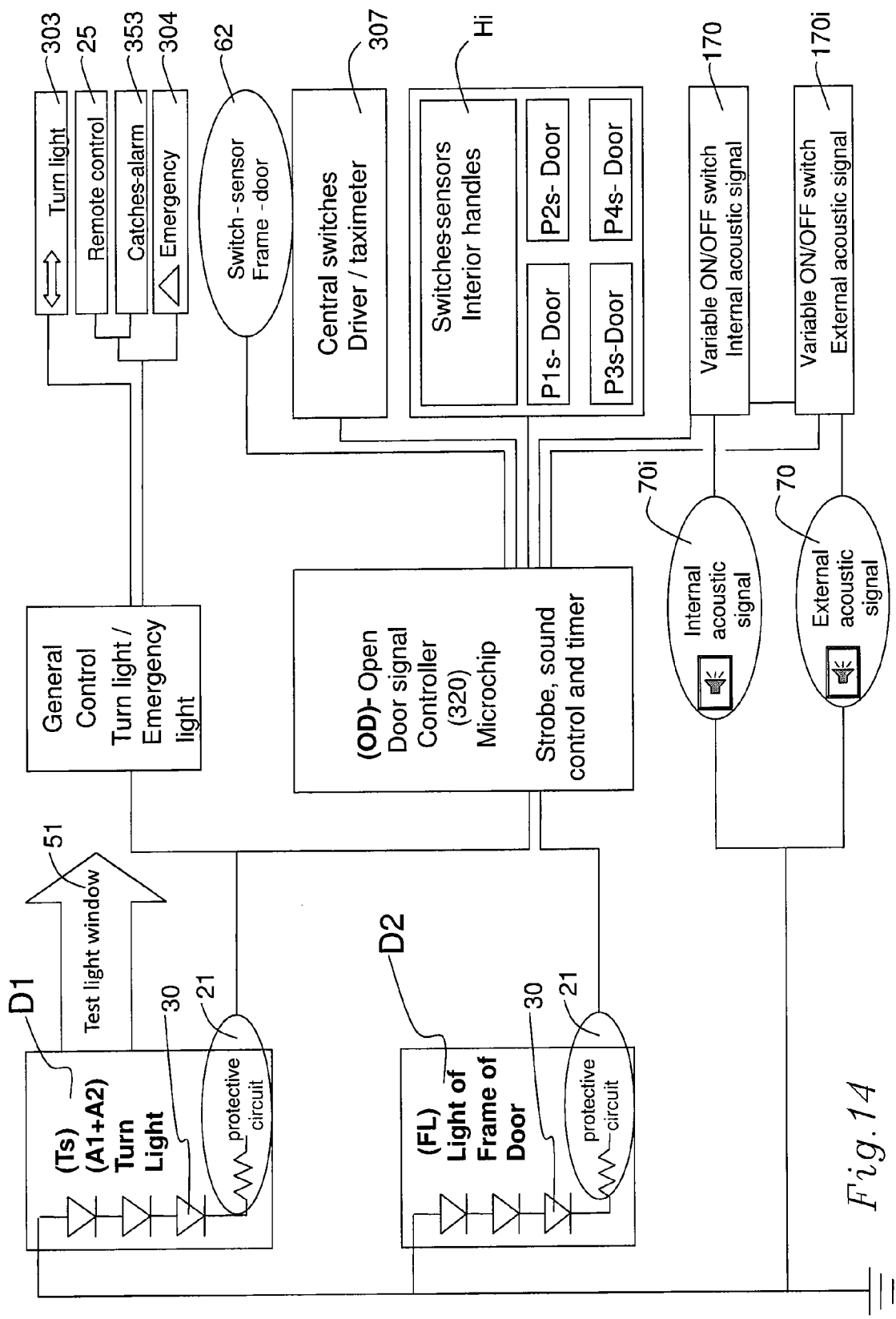
Figure 15:
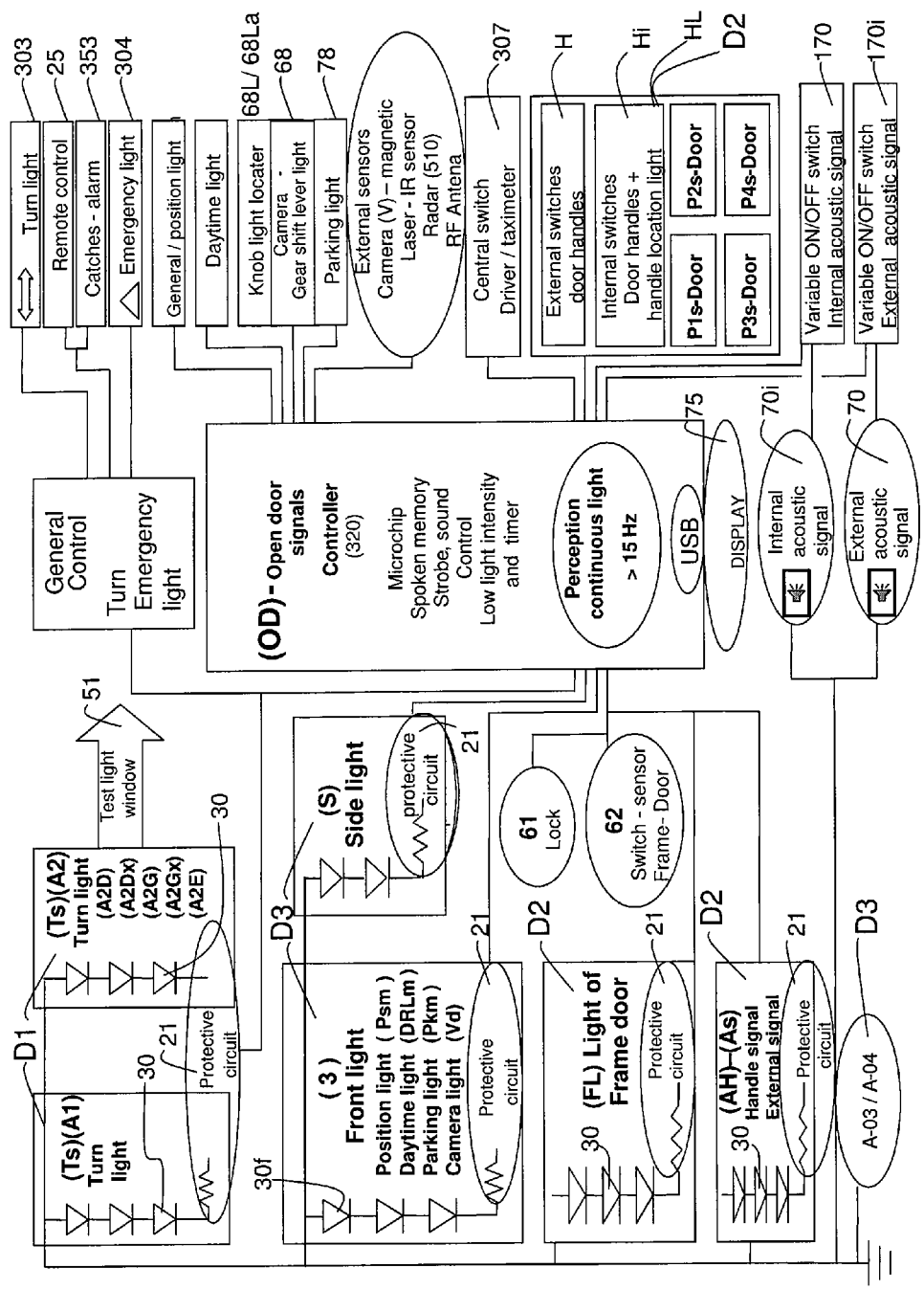

FIG. 14 is a basic operating outline of the early open door warning system emitting the signal OD using a first device D1 associated with a second device D2, for one embodiment; and FIG. 15 is a complete operating outline of the early open door system with at least three associated devices D1, D2 and D3+the location signals and the sensing elements or aid cameras, for another embodiment.

DETAILED DESCRIPTION OF SEVERAL EMBODIMENTS

Figure 1:
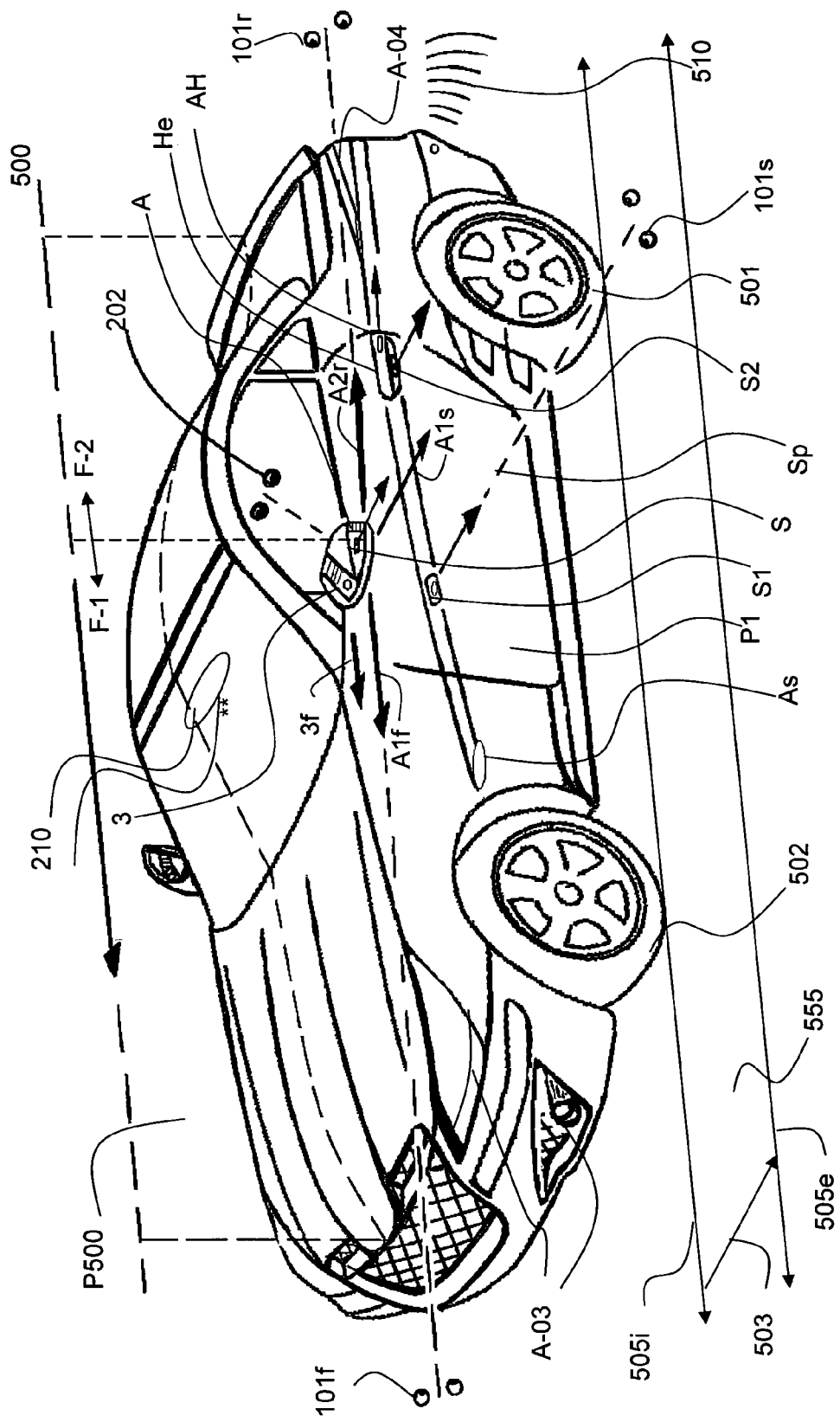
FIG. 1 is a perspective view of a vehicle with a side mirror including a first light emitting device D1 for emitting an external signal A and a side location signal S, another front location signal 3 and other external devices that can be associated with the system, as well as front light signals A-03 and rear light signals A-04; the dangerous passageway 555 parallel to said vehicle and on the same side of the vertical longitudinal mid-plane P500 where said devices interact and the points of view of the internal protagonists 202 or of the driver, and the rear 101r, side 101s and front 101f external protagonists are also observed.
Figure 2:
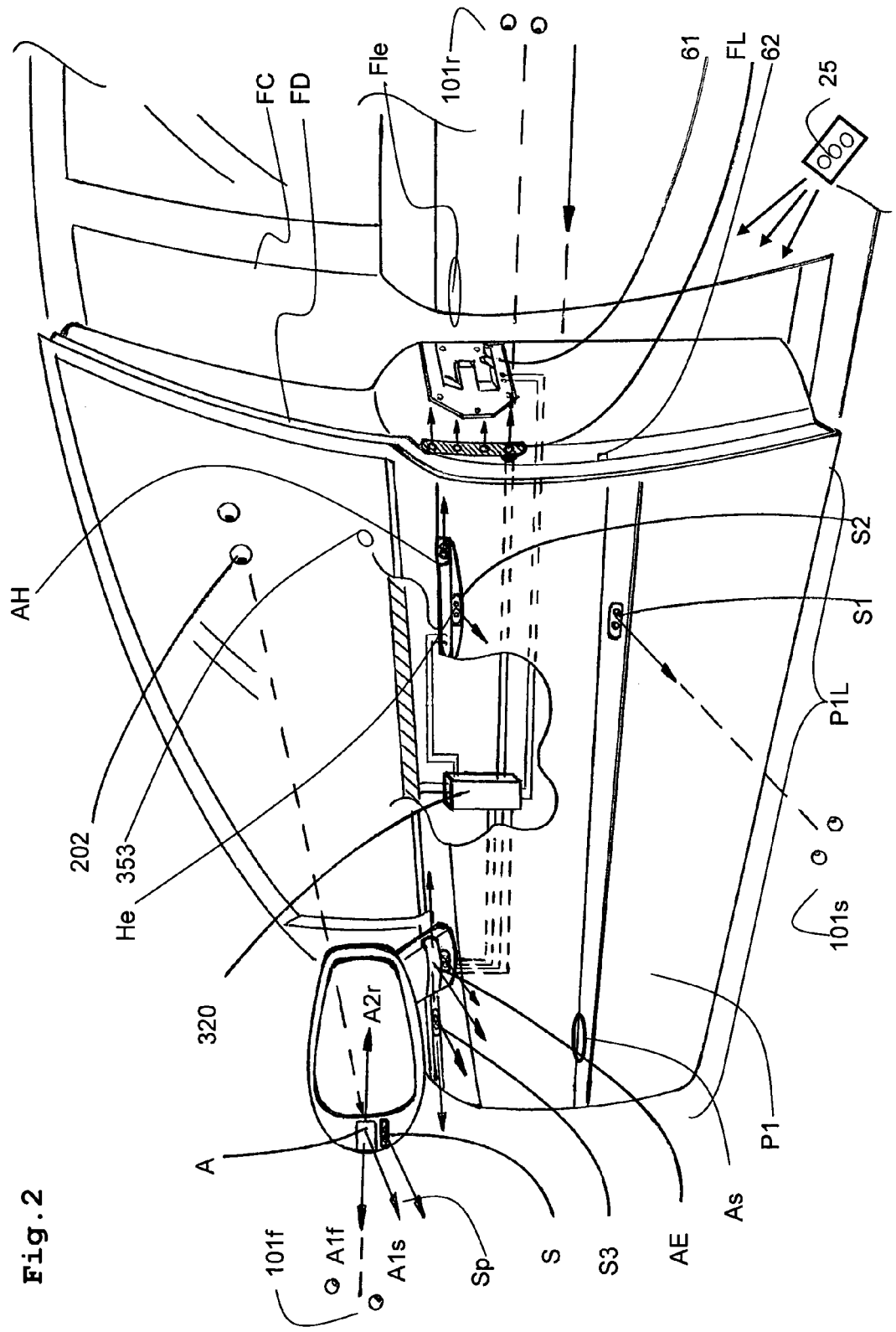
FIG. 2 is a perspective rear side view of a half-open vehicle door according to FIG. 1 with the second emitting device D2 emitting a complementary signal FL arranged in the door frame FD, associated with the first light device D1, the opening position of the door P1 and its frame FD determining the view of FIG. 2, and offering a clear view of the internal installation of the controller 320.

To understand an embodiment of said early door open warning system, before explaining the operation of the signals, light devices or modules, locaters, operating light indicators or elements used, the location and what said elements are will be defined, the points of view of the hypothetical participants involved and the dangerous scenario in which they are all involved in the following order:
1.0.—Scenario.
1.1.—Points of view, light and shaded areas, signal projection area.
2.0.—Signals of the system, light emission angles and directions.
2.1—First light emitting device D1 emitting a type A turn signal in the side mirror, or in the front A-03 or rear A-04 or on the side As of said vehicle.
  2.1.2.—Type A signal emission directions and angles.
  2.1.3.—Alternative locations and variants of the signals.
2.2.—Third light emitting device D3 emitting Type 3 signal: front signals or position locater lights in the external side mirror.
2.3.—Another third light emitting device D3 emitting Type S signals: side signals or position locater lights in the external side mirror.
2.4.—Second light emitting device D2 emitting complementary signals in the internal door frame FL.
3.0.—Complementary elements: handles, switches.
3.1.—Locaters, operating light and acoustic indicators,
3.2.—Intrusion sensors, cameras, detectors.
3.4.—Transparent surfaces, windows, reflectors for the contrast and separation of functions, independent modules, additional modules, structural parts, casing covers, integration of signals in a module or in structural parts of the side mirror.
4.0.—Operation of the system, controller, programming, intercommunication, action sequence and times.
1.0.—Scenario: FIGS. 1 and 2.

There is defined a passageway 555 or dangerous space parallel to the axis of travel 500 of a vehicle where accidents can occur when opening the doors, located on its side, tangent to its rear and front wheels 501 and 502 having a width represented by a vector 503 which is at least equal to the length P1L of any of its open doors P1; this proportion is applied to any type of vehicle door, no matter how it opens, for example upwards, outwards, slidably, rotatably, or a combination thereof. It extends forward and backward for both sides thereof, where other vehicles or individuals travel and are at risk of colliding with said open door or of the passengers of said vehicle being hit when they occupy said passageway when getting in or out of the vehicle.

The reference numbers indicate:
500 is the axis of travel which coincides with the forward movement direction of the vehicle.
P500 is the vertical longitudinal mid-plane from which the signals are produced to indicate an open door one either side of said vehicle.

The solid projection of said passageway 555 along the height of a vehicle is the target space of the different presence or intrusion sensors-detectors which sense-detect bodies or vehicles for activating electronic aid for the system, activating a locking or warning of an action thereof, and it is the space in which the side mirror with at least one signal that is seen from behind, used as a turn signal and being used in this system with a second function as an early open door warning signal, is introduced.

1.1—Points of view, light and shaded areas, signal projection area.

There are three external points of view and one internal point of view, indicated in FIGS. 1, 2, 3 and 5 as follows:
101f Front external point of view from any point of said passageway at the front of said vehicle.
101r Rear external point of view from any point of said passageway towards the rear of said vehicle.
101s External side point of view, point of view perpendicular to the axis of travel of the vehicle at the height of the doors or dark side of said vehicle.
202 Internal point of view of the interior of the vehicle from where the driver or the passengers notice the image produced in the external side mirrors outer as to what is happening behind the vehicle and notice the location signals of the elements to be used and the aid signals provided by the system by means of sensors or cameras for deciding on the action of opening or not opening the door thereof.

The three external points of view are in a signal light projection area 100, and the internal point of view 202 is in a shaded area 200 with respect to the projection of the external signals.

Signal light projection and orientation group:
F1 is the group or area of functions where the signals which are directed towards the front-side of said vehicle.
F2 is the group or area of functions where the signals which are directed towards the rear-side of said vehicle.

2.0.—The system is characterized by using a first emitting device D1 for emitting light signals preferably located in the side mirror which are visible in the three external points of view, i.e., the front, the side and the rear, with typical light emissions for each of these directions, and/or a second emitting device D2 emitting a complementary signal located in the frame of door visible from behind when said door is opened; it alternatively uses signals emitted by said first device D1 or by a third device D3, or additional device, located in an external part of the door, bodywork or fender of said vehicle on the same side with respect to said plane P500, or signals located in the front A-03 or rear A-04 of the vehicle and on the same side.

These signals are classified into groups, by projection of their beams, towards where they are directed; their location;

their functions when the same device is used in at least two different ways; and the way they are integrated with one another. The elements of group 2.0 are seen in FIGS. 1 and 5.

The advantage of some signals being located in the side mirror for this system is that the body thereof is introduced in the space of the dangerous side passageway 555 relating to the participants concerned traveling therein, due to this strategic position, said signals carry out at least a second function when they provide the early open door warning or during the door opening positions, the signals emitted as being indicative of said open door warning having been referred to herein as signals OD.

The functions, the combinations thereof and uses of the signals associated with the system are referred to as follows (see FIGS. 12 and 13):

Ts: Turn signal, emitted by the first device D1, blinker function, uses type A modules that are independent or associated with one another, located in the side mirror, in the support or arm E thereof or in another part of the bodywork.

Psm: Front position light located in the side mirror, emitted by the third device D3 associated with the first device D1 and the second device D2, or associated only with the first device D1 as an external signal emitting light continuously towards front by means of module 3 and serving to locate the vehicle and the front door at night.

Pkm: Parking light located in the side mirror, continuous front light function, using module 3 (responsible for producing the front light signal 3), and serving to locate the vehicle and the door when the vehicle is stopped.

DRLm: Daytime traveling light located in the side mirror, continuous front light location function, using module 3, serving to locate the vehicle and the front door during the day, it is usually the same position light Psm emitted by the third device D3 but used during the day with greater light emission intensity than at night.

S: Side position light located in the side mirror or outside it, continuous side light location function, using module S (responsible for producing the side light signal S), it can be used alternatively as a third or fourth device D3, D4, associated with the first device D1.

FL: Complementary light, located in the door frame FD, complementary light location function, is independent, is emitted by the second device D2 associated with the first device D1, it can include the sensor-switch-detector 62, forming a single integrated module.

FLe: Complementary light, located outside the door, adjacent and close to the frame, it is an alternative to FL, and is an emission variant of the second device D2.

OD: Open door signals, produced using any of the operable associated signals or devices D1, D2 and/or D3 or others when they are activated before the door is opened.

CL: Is the form of continuous operation of the emission of a light.

A vertical emission angle of at least +/−15° is considered for all the signals, the complementary light 3*d* for lighting towards the front and underside of the camera V being excluded.

2.1—Type A external signals, emitted by the first device D1, their function is as a turn signal and they are located in the side mirror; they are seen towards the front, the side and rear, at least one of these projections being towards the rear (see FIGS. 1 and 5).

Type A signals normally integrated in the cover casing C or in the chassis-frame-casing D of said side mirror can be an integral part of a single signal module within which two areas A1 and A2 are distinguished (see FIGS. 5, 6, 7, 10 and 11).

A1: turn signal, side front part of the signal A within the front emission functions or F1.

A2: turn signal, part towards the rear of the signal A within the emission functions towards the rear or F2 when it is integrated under a single shade and device with A1, or is an independent module constructed in A1 but associated in operation.

The following types of signals or modules exist as variants of signals towards the rear A2:

A2D: Turn signal towards the rear located in the frame D of the side mirror, independent of A1 (see FIGS. 6 and 7). It is an independent module for a turn signal towards the rear, integrated in the frame D of said side mirror and partially blocked by the casing C, C1, C2.

A2Dx: Turn signal located in the frame D or casing C1 in a plane that is under edge of the side mirror plate glass element 50 (see FIG. 8).

A2Gx: Turn signal towards the rear located in the edge of the side mirror plate glass (see FIG. 8).

A2G: turn signal towards the rear located under the side mirror plate glass 50, independent of A1 (see FIG. 8).

A2E: Turn signal located in the support E or connection of the side mirror to the bodywork (see FIG. 8).

Said signal towards the rear A2 for any of its variants has a side appendage which optically deviates part of the light of the signal that will be reducibly visible by the driver 202, through a light outlet 51 (see FIGS. 7 and 8), while at the same time part is projected towards the rear and is visible at the eye points 101*r*, the function thereof being that of indicating the operation of said turn signal and of locating the edge of the plate glass 50 and aiding at time of looking towards the rear upon activating signal OD system as an open door warning.

The surface of said light outlet 51 or the span thereof has an engraving, polishing or vertical micro-grooves which reduce the light in the direction of the view of the driver 202.

The frame D in the end area distant from the bodywork blocks the outlet of the signal at least in part such that the eye points of the driver see said signal outlet behind him/her tangentially according to the visual line TL (FIG. 12) or they do not see it, or by default they see it through said window 51 such that he/she does not bother to look at the plate glass 50 since the focal axis of emission has backwards direction A2*r*, towards points 101*r* (see FIGS. 1, 2, 3 and 5).

As an alternative, A2D (see FIGS. 6 and 7) has its light outlet from the frame casing D and is integrated in a single device with A1.

The signal, or signal modules A2G, is an embodiment, see FIG. 8, consisting of an independent turn signal module towards the rear in the direction of the points of view 101*r* for distributing the light in the direction towards the rear according to the focal axis A2*r* (see FIGS. 1 and 3) integrated under the plate glass 50 or in the perimeter of the plate glass 50 forming the plate glass-signal assembly which can be added additionally to the existing plate glass and superimposed thereon.

Thus, the entire plate glass-signal assembly produces a light that is not directly visible by the driver 202 (with the exception of the light outlet 51, which is visible by the driver 202) or said signal outlet area is directed in the line of signal emission towards the rear A2*r*.

Reference 52 indicated in FIGS. 7 and 8, indicates an alternative operating light indicator of the turn signal Ts and of open door OD, or poorly closed door warning said light indicator being independent and having its own light source located in any part of the side mirror or in the interior of the vehicle visible to the eyes of the driver 202.

Said side mirror has therein a space, or its plate glass 50 has thereunder a volume which allows placing a video camera V (see FIG. 7), or infrared IR emitters-receivers, or a PCB board as a radio frequency antenna associated with an amplifier, signal emitter or filter; the purpose of these elements is to detect the presence or approach in the dangerous passageway 555 in direction A2r of vehicles, or to intercommunicate therewith, with any type of encoded language or frequency, upon opening the door for emitting a signal acting on the system, given a sound or visual alert signal, or blocking or delaying the opening of the door an instant.

Alternatively, said window Vx is a space adjacent to the edge of said glass of the mirror outside its perimeter without it affecting or substantially reducing the field of vision of the mirror, it is in any part of the side mirror (for example in the location illustrated in FIG. 7) or the bodywork including the support or bumper thereof, such that it detects without interferences the objects that are approaching in the passageway 555.

The plate glass assembly can be a single plate glass 50, as illustrated in FIGS. 7 and 8; or a semi-plate glass 50b that is added, see FIG. 13, adhered or fixed on the existing one; or a composite plate glass assembly 50a+50b+signal as a replacement for the existing plate glass without a signal or the variants thereof plus furthermore equipped with a presence sensor or camera V, or an RF antenna.

The antenna located under one of said pieces of plate glass is, for one embodiment, of the RF condensate type, of the type printed on a PCB, and allows intercommunicating with other adjacent vehicles for communicating the intention of opening the door which is emitted by the system upon being activated or upon touching the handle Hi, He; therefore, not only does it emit a visible or audible signal, but rather a directed RF signal, or an encoded signal or with an exchange language, for example Wi-Fi type (see FIG. 13).

2.1.2.—Type A signal directions and angles of emission (see FIG. 5):

A1f: front direction of emission towards the eye points 101f, parallel to the axis 500 of the vehicle.

A1s: side direction of emission towards the eye points 101s, perpendicular to the axis 500.

A2r: rear direction of emission towards the eye points 101r, parallel to the axis 500.

A2a: minimum angle of 55° of horizontal emission of the signal A2 towards the rear from one parallel to the axis 500 outwards.

2.1.3.—Alternative location and variants of the signals (see FIGS. 1 and 2):

A2E: Turn signal with the features of A but integrated in the support E of said side mirror to the vehicle door (see also FIG. 8).

The system comprises the following signal modules as variants outside the side mirror:

AH: Turn signal towards the rear located in the exterior handle He of said door P1.

As: Turn signal towards the side-rear located in the side of the vehicle outside the side mirror, in the door P1, in the fender, in a side air vent, in an appendage or in a side aerial arm.

The system uses any signal which is used as a turn signal and it is located in any part of the side mirror, including under the plate glass 50 and emits through the dichroic properties of the glass of the mirror or through small slots made by laser in said glass of the mirror, or in any part of the side of the vehicle on the same side of said plane P500, including the front and rear signals thereof such that they are visible at least from behind at the eye points 101r within said dangerous side passageway 555; or which applies any direct, indirect light emission technique by means of an external surface acting at least in part as a light guide, or light reflected in multifaceted reflectors.

The type A signals emitted by a single device, and as a first device of the system D1, or in separate associated two-part versions A1, front, and A2D or A2G, rear, can be produced by LEDs having a different color from that of the turn signal intercalated inside D1, and are activated in the open door signal OD, producing for this function light of another color, preferably coinciding with the complementary signal in the frame of the door FL or emitted by the second associated light device D2.

2.2.—Type 3 signals emitted by the third associated light device D3, or additional light device, located in the side mirror or in the support thereof, or arm support E, to the bodywork. They are continuous on white light signals within the area F1 towards the front, their focal axis is parallel to the axis of travel of the vehicle 500, they operate as a front position light at night or daytime travel light, being different when emitted during the day because it is done by the same device at a higher light intensity. The function thereof is to distinguish the vehicle seen from the front and, for one embodiment, both sides work simultaneously in association. They also produce the parking light Pkm (see FIG. 13) for locating the parked vehicle although the engine is shut off.

For a clear perception of day, said signal emits in its focal axis 3f a minimum light intensity of 100 candelas and occupies a minimum emission surface on the shade thereof of 20 $cm^2$.

When said device D3 carries out a different function from that of an open door warning, it performs a location function in which the same device D3 emits an amount of light for being noticed when traveling during the daytime and at night; and at night the same emitters or part of them emit at an electronically lower or reduced light intensity at a minimum of 2 candelas in the same focal axis and an equal or smaller surface in part with respect to that emitted and used during the day.

The directions and angles of emission of the signal 3 can be seen in FIG. 5 and are:

3a is the minimum angle H +/−20° of the front signal 3 and can reach 80° outwards and on each side of the vehicle.

3f focal axis of emission of the signal 3 towards the front parallel to the axis 500 where the light intensity is maximum with respect to the rest of the emitted light.

2.3.—S type signal is a side location light of the door P1 or area of doors, located in the side mirror, or integrated in other signals, or independent, emitting perpendicularly to the axis of travel 500 of the vehicle and using a continuous on yellow light, associated with the light of the other side of the vehicle and allows noticing the vehicle from the side at night and calculating exactly where the door to be located is and noticing the dimensions of the vehicle on its dark side.

In the event that the door is open, when its position is rotated or when said side mirrors are folded automatically when the engine is shut off or the contact key is removed, said signal S allows knowing the position of said door P1 because the signal which is perceived at the front it becomes the one which was perceived from the side and is of a different color than said first front signal type 3. Its angles of emission and direction are, as can be seen in FIGS. 1, 2 and 5:

Sp is the focal axis of emission of the signal S towards the side, perpendicular to the axis 500 where the light intensity is maximum with respect to the rest of the emitted light; it uses a minimum of 0.6 candelas in this focal center.

Sa is the horizontal angle H of emission of the signal S with respect to the axis Sp having at least +/−29°.

As a variant, this signal S is located in other parts of the side outside the side mirror, S1 in the door P1 or in the bodywork close to the doors, S2 in the exterior handle He or S3 in the support of the side mirror to the door E.

2.4.—FL: Light of the edge or frame of the door FD, emitted by the second light device D2 associated with the open door signals OD. It is a complementary signal of group F2 towards the rear located in the frame or edge FD of the door P1 which emits any light color except white, preferably red or blue as different from any other light, it works in association with the electronic controller circuit 320 and is exclusive of this system; it is seen from 101*r*, the door is barely opened or moved in all its opening positions (see FIGS. 1 and 2).

Said second light emitter device D2 emitting said signal FL can be included and integrated in a single module with the sensor-switch-detector 62, sharing parts such as the circuit interface, wiring, connector and structure.

The light signal FLe, which is a complementary signal of group F2 towards the rear and side, alternative to FL, can be seen in FIG. 2, and it is located in an adjacent area of the frame of the door and outside of said area; it serves to determine the opening position thereof, visible from 101*r*; it can be an S type signal to which a second function is applied.

Figure 3:
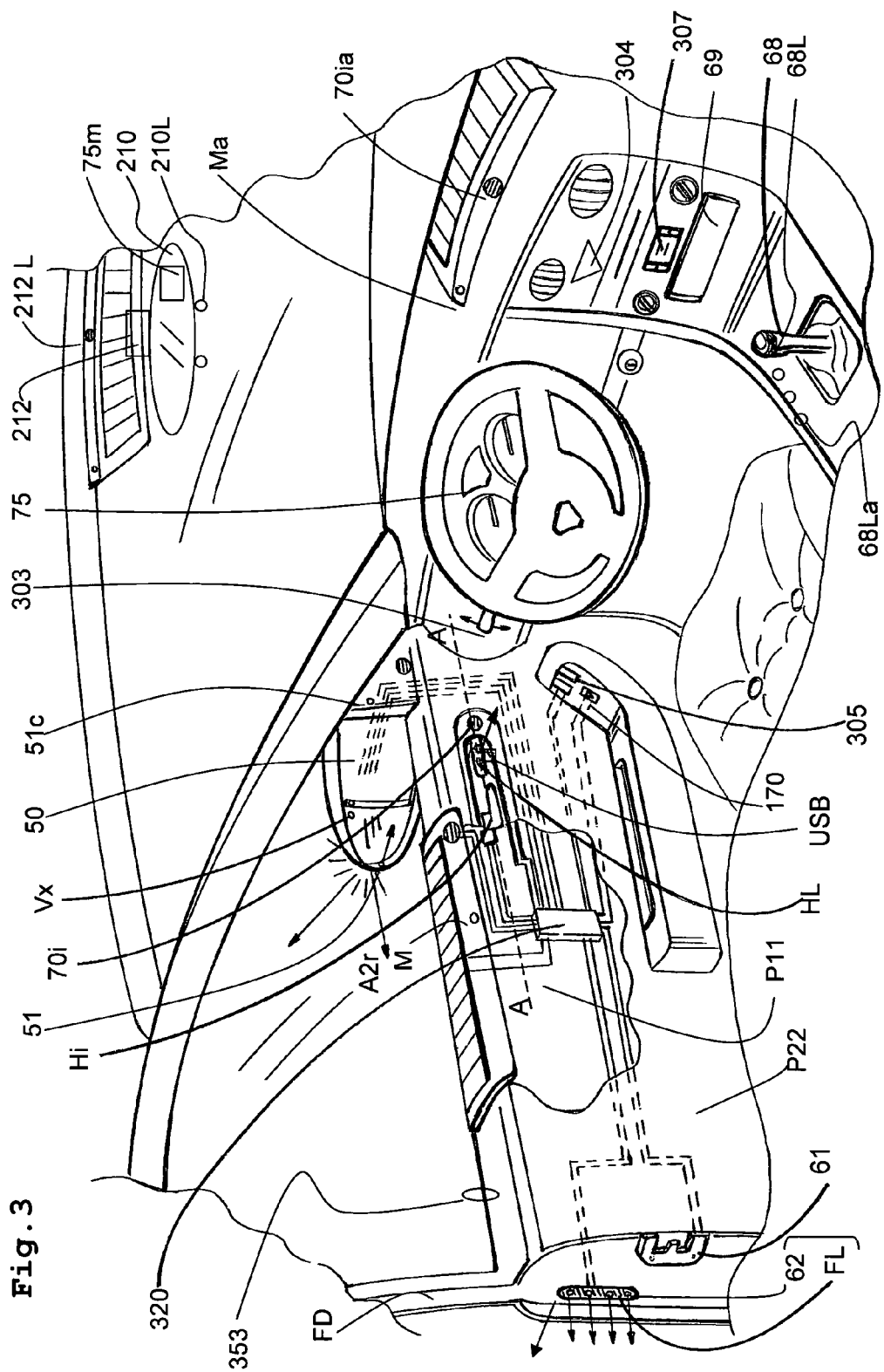
FIG. 3 is a perspective view of the interior of the vehicle seen from the vehicle driver position 202, where the door is represented partially transparent, and showing the controls, locks, interior handle, side and rear-view mirrors, locater lights and complementary operating light indicators of the system as a guide for the elements to be used or for looking step-by-step when opening the door, or controlling and known the state of the locks or if the doors are correctly closed, and the sensor-switch 62 integrated in a module with the signal of the door frame FL.

3.0.—Complementary elements: handles, switches (see FIGS. 1, 2 and 3).

The proposed system is activated when the exterior handle He and interior handle Hi are manipulated in the free movement MF thereof before unlocking the lock 61 of said door P1, and once the catches have been released manually, automatically with the key or with the remote control or any form of recognition. The proposed system comprises the following complementary elements, which can be seen in FIGS. 2 and 3:

Hi: interior handle of any door.

He: exterior handle activating the system once the locks are unlocked and the alarm and catches of the vehicle have been released by any opening means, such as by means of key, card, remote control, numeric code, sensor or detector.

HL: Locater light of the interior handle and indicator signal of the locked or unlocked state of the locks.

P1: driver or passenger door of the vehicle.

P11: interior volume or cavity of the door.

P22: internal dry part or internal panel of the door towards the interior of the vehicle or interior that cannot be accessed from outside.

P1*s*: switch, sensor-switch attached to the handle which closes the circuit and emits the signal activating the system.

P1L: length of a P1 type door independently of the manner in which it opens, serving as a reference for determining the width of the dangerous passageway 555.

Figure 4:
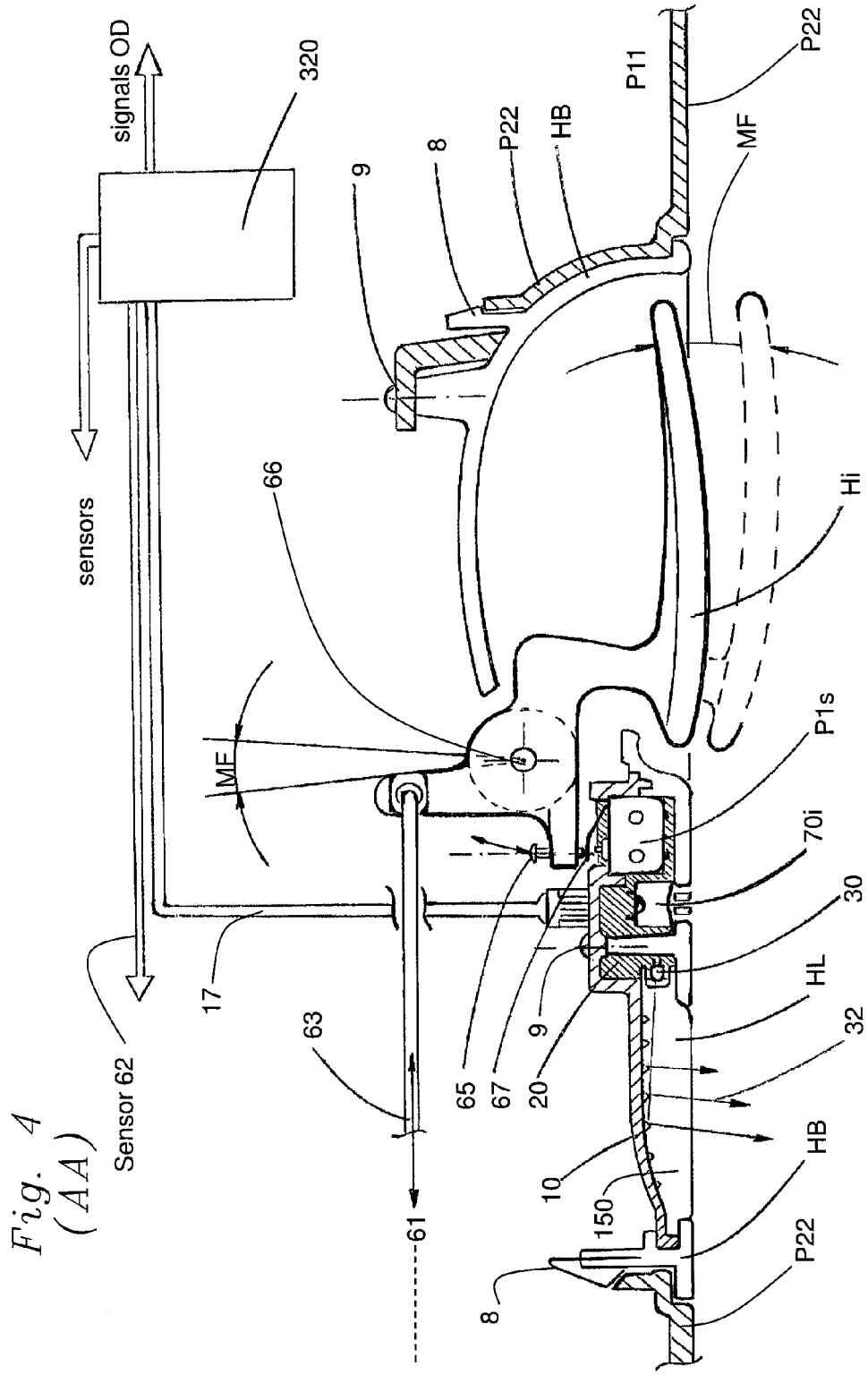
FIG. 4 is a horizontal cross-section according to a cut through the A-A plane indicated in FIG. 3 of the interior handle Hi with the switch-sensor P1s of the door activating the system in the free movement MF, before unlocking the lock 62 of said door and details of the locater light signals HL and sound signals 70i, and light indicator indicating the locked-unlocked status of the doors.

As well as the following elements or features which can be seen in FIG. 4:

MF: free movement of the interior handle Hi or exterior handle He before opening the door; it is within this tolerance movement prior to activating the locks 61 where the process of activating the system is initiated, which process is independent of the remote control; the system is activated by simply manually operating or touching either the interior handle Hi or exterior handle He of the doors.

FD perimetric frame or edge of the door.

FC perimetric frame of the opening of the door corresponding to the bodywork of the vehicle.

Frame-door opening assembly FD-FC where the passengers get in or out of said vehicle.

61: lock assembly mechanism.

62: sensor-switch-detector or open door switch located in any part of the frame-door opening assembly FD-FC detecting when the door is barely open or poorly closed.

63: Bowden cable applying traction to open the door.

65: regulating screw to achieve an optimal point of activation of the system using a switch by adjusting the movement MF of said handle.

66: axis of rotation of the handle Hi.

67: antifriction element between the switch P1*s* and the handle H.

68: gear shift lever, or shifter enabling the system for the function of light Td and the camera complementary V, associated with the commands of the blinker 303, or indicating by means of the locater HL that it is in neutral or parking position by means of Hall-type magnetic switches, or that it is ready to initiate the process of opening the door, these positions being associated with the signal locaters HL, 68L in the knob of said lever or 68La adjacent to said lever.

68L: indicator signal located in the knob of said gear shift lever 68 indicating the locked or unlocked state of the locks, associated with or independent from the similar light of the interior handles HL.

68La: signal similar to 68L but adjacent to said gear shift lever 68.

M: microphone or data input, or introduction of memory chips that allow recording the open door message or being part of the hands free communication system, or any equipment using loudspeakers in said vehicle.

69: radio which can be associated with the intercommunication or it can be the emitter of the internal acoustic signals.

3.1.—Complementary locaters and operating acoustic and light indicators which can be seen in some or all of FIGS. 3, 6, 7, 12, 13, 14 and 15.

These elements, together with the external signals, are associated with an electronic controller circuit 320, and the function thereof is to indicate, step-by-step, the state of the locks 61 and the process of opening the door when passengers are getting in or out, producing stimuli on the participants involved.

These stimuli or signals define their use based on observing the needs and roles of said participants involved of the environment and of the vehicle, and some can be modified at the discretion of the interested party.

The following affect the driver of the vehicle and are:

51: Optical light outlet by means of a small window in the frame casing D of said side mirror, as a test or indicator of the operation of said turn signal, derived from part A2 thereof or expressly, visible to the eyes of the driver 202, consisting of an transparent appendage associated with the same shade of said first device D1, or it is a partial transparent appendage part and associated therewith are prisms and internal reflective surfaces for the purpose of guiding the light to said light outlet surface 51; it is engraved or has micro-grooves for reducing the light in the direction of the eyes of the driver 202. It serves to locate the plate glass-mirror assembly 50 upon activating the open door system which emits signals OD (See FIGS. 3, 7 and 8).

52: Independent light indicator and locater of the plate glass-mirror assembly 50, consisting of at least one LED of any color, located in any part of the bodywork, frame of the side mirror, or internal part of the vehicle, or internal part of the fixing of the side mirror to said door, acting in association with the first emitter device D1 emitting the signals A and visible from the point of view of the driver of the vehicle 202 (see FIGS. 7 and 8)

70: external acoustic signal for improving the alert to the environment, especially in pedestrian areas, stops or passengers getting in or out (see FIGS. 14 and 15).

70*i* Internal acoustic signal is a stimulus for creating a conditioned conduct, for the driver of the vehicle or the passengers to look behind them, it can even emit a modifiable, recordable or symbolic spoken message, or a message the volume and tones of which can be modified (see FIGS. 3, 14 and 15).

Other acoustic warnings can be made by association with the radio system of the vehicle 69 or the telephone hands free system 70*ia* (see FIG. 3).

75: Light display in the dashboard shared with other functions of said vehicle, emitting written phrases and words or attention and prevention call symbols, such as "look backwards when getting out" when the system or the signal OD is activated (see FIGS. 3 and 15).

HL: Locater light of the handle Hi and light indicator signal of the state of the locks and relating to the speed or state of stopping of the vehicle indicating when the system can start to operate; it is associated with the interior handle Hi, it is the first step of the guided conduct system, and its objective is to produce calmness to prepare the attention phase before opening the door and easily locating said handle Hi (see FIGS. 3 and 4), activating the system from inside; it is produced by at least one LED of a single color or two colors, and it uses any optical technique, preferably a transparent optical body 150 or light guide with reflection of prisms, slightly raised letters or an engraved surface, and it is associated with said controller 320 or the lock of the door 61. It indicates with one color or the other, or with a change of blinking frequency, when said door P1 is locked or unlocked, or blocked, or if there is danger detected by the sensors, or it operates together with the signal OD.

Alternatively, said system can use locater lights with the same features and operation of at least one color or two colors located in any part of the interior of the vehicle, for example the locater in the knob of the gear shift lever 68L, or adjacent thereto 68La, or the locater 210L located in the internal rearview mirror 210, or the locater 212L in the support 212 of said rearview mirror or in any part visible by the driver.

3.2.—Intrusion sensors, cameras, detectors.

The proposed system is provided with intrusion sensors or uses sensing systems of any type operating in the vehicle for other applications, being associated for this specific function once the system is activated and vehicles in the dangerous passageway 555 are perceived.

The video cameras V are oriented towards the rear or front of the vehicle, and as regards their operation, they are associated with direct lights, being able to be infrared emission light, and the sensitivity of the camera is suitable for operating under infrared lighting. In all cases the light-camera association is to facilitate the operation of the latter. Said cameras are associated with a programmed controller which analyzes the images or with a display 307 to facilitate decision making.

Another way to detect intrusion is by infrared, IR, diodes and photodiodes, or by a peripheral emission radar 510 arranged in any part of the bodywork, for example in the bumper, as is seen in FIG. 1.

Other references to additional elements are seen in FIGS. 1, 2, 3 and 15, indicating the following elements:

Vx: window in the mirror 50 made by laser process leaving the glass transparent and free of the metal coating deposited thereon for producing the mirror and thus facilitating the location of a camera thereunder with vision towards the rear.

V: video camera which captures images of the passageway 555 (see FIGS. 7, 9).

Said cameras or sensors can be located outside the side mirror or in the support E thereof or in the bodywork or the bumper.

The same LEDs are used for different functions, emitting with different intensities; for example, the position light Psm for night use works at a lower percentage, with respect to the same LEDs, then with the DRLm, or daytime travel light, function, for which they work at 100% and consists of a continuous white light perception and location signal of light towards the front from the side mirror; said signal is used at a higher intensity during the day and its intensity is automatically reduced when passing to another function at night, such as front position light Psm, or parking light Pkm.

These signals allow the location thereof even with the side mirror folded when parked.

This use for a location light in an automotive vehicle applies to other perception or location lights of the vehicle located in the front A-03 or rear A-04.

3.4.—Said system uses for its external signals transparent surfaces, windows, reflectors for the contrast and separation of the functions, independent modules, additional modules, structural parts or casing covers, integration of signals in a module or in said structural parts of the side mirror.

The light devices D1, D2, D3, or signal emitters, can be integrated (all or some of them) under a single shade 1, such as in the case of the embodiment illustrated in FIG. 5, where the transparent cover 1 is common for light devices responsible for emitting signals 3, A1, A2 and S.

For one embodiment, at least one light device D1, D2, D3 is independent from the rest or from part of a single associated signal, such as for example A1 and A2Dx.

For another embodiment all the light devices D1, D2, D3 are independent from one another.

For the embodiment illustrated in FIG. 6, the transparent covers occupy one or more external windows for the purpose of performing one or more functions, or when at least one module is a signal independent from the rest of the signals, and said independent signal has the option of having one or more windows for the same function, or two light devices form a single module independent of another one comprising a third device, the different devices sharing parts of their structure.

EXAMPLES a—The front signal 3 is independent of S+A1, which are joined together.

b—The front signal 3 is independent of A1+A2G, which are modules separate.

c—The front signal 3 is independent of A1+A2+S, which are joined together.

d—The front signal 3 is independent of A formed by A1+A2, which are joined together.

The following names are used:

1: When the external transparent surface is a single part for all the signals or devices clustered or joined together in a module, or when they come from a single mold and several functions separated by a separating surface R between the cavities thereof are integrated in said module (see FIG. 12).

1*a*, 1*b*, 1*c*. (see FIGS. 6, 9, 10 and 11) When the transparent surfaces are different parts of devices independent from one another and occupy different windows, they can be integrated in opaque structural parts of the side mirror which are not signals by dual-material injection process or mechanical assembly. FIGS. 10, 11.

A single shade for a single device or signal can externally have several windows and is joined to or extends behind a structural part of the side mirror that does not transmit light (see FIGS. 6, 9, 10 and 11).

The shade can be a single part for one or more functions which is partially blocked behind at least one of said structural parts of the external surface C, C1, C2 or D.

R: Separating surface or sectors between the reflectors or cavities of the same signal or of different signals formed by the external transparent surface 1 close and parallel to the reflective surface 12. FIGS. 5 and 12.

Rk: FIGS. 5 and 6. Complementary reflex reflector surface of the light outlet of any signal, especially side S, formed by internal machining of the external transparent surface, based on a series of associated prisms which reflect the light in the same direction in which it is received. Said surface is yellow if it is a side reflection and white or colorless if the reflection is a front reflection.

Said devices are secured to the structural part of the side mirror or to the bodywork by clamps, screws or assembled between parts which secure or adhere then. All of them can be attached to one of the cover, then becoming a unit, for example C2 of FIG. 11, or between the cover casing or frame parts.

External complementary opaque structural parts:
C: Cover casing normally painted which is partially associated with the frame casing D.
C1: Lower cover casing normally not painted.
C2: Cover casing occupying the position farthest from the bodywork of said vehicle as a protection against blows of very hard material or anodized aluminum (see FIGS. 5, 6, 9, 10, 11).

Said signals can be modules associated with one of said covers and integrated as a cover-signal assembly or replacement kit necessary for making said system operate.

The type 3 front signal or type S side signal which is continuously on can be incorporated as an additional module in said side mirror, to which they are added and fixed externally or internally as an additional part or they are associated with a cover casing forming a kit which replaces the cover casing existing in the side mirror independently of if said side mirror or cover casing or external structure has a turn signal or does not have signals. Or it may need to be equipped with a type A signal with higher light intensity towards the rear or with an operating indicator 51 or two light colors or with features suitable for carrying out the function OD.

A side mirror with a single plate glass 50 can receive as a replacement an additional plate glass+A2G signal+video camera+RF antenna.

A plate glass 50 of a side mirror can receive a supplementary additional plate glass 50a (see FIG. 13) plus the signal A2G which can be attached to said plate glass 50 and said signal connected to a type A1 front signal of said side mirror, or it can receive a new plate glass 50+A2G.

Other elements and features illustrated in the attached drawings are the following:
D: Frame casing of structural part sometimes integrated in the chassis and demarcating the opening where the side element or plate glass is housed.
E: Support or connection of said side mirror to the door, crank, fairing or bodywork of the vehicle.
50: Plate glass, glass of the mirror or rearview element when it is just one.
303: Command turn signal.
305: Switches for the voluntary control of the open door warning independent of the handles Hi and He.
307: Central switches for the voluntary control or taximeter independent of the handle Hi or He.
M: Micro for recording messages as the sound signal for subsequent use at any time while the system is executed.
Ma: Micros in alternative locations or integrated in other sound or communication, telephone hands free, or radio devices.
USB: similar input connection for transferring data or messages to a memory for subsequent use at any time while the system is executed.
30: The LEDs emit light of any type, of a single chip by capsule or multichip of more than one chip per capsule, or chip on board. They are arranged on a PCB or FVx fiberglass circuit, tracks imprinted on a metal base, especially A1, or plastic laminate, or folded metal tracks or tracks associated with a metal body or support for dissipating the heat of the LEDs, for example polyester adhered to said aluminum metal base.

The different signals and devices of the system allow different technical solutions of light emission, using any reflective means, refractive means, light guides, optical devices or different light sources, or one or several cavities with at least one emitter for each of them or having one or more windows for a single signal or using multichip LEDs with more than one chip for a single support capsule, for one and the same purpose of emitting the light signals and stimuli which represent the open door functions OD.

The devices have a protective circuit 21 which can be integrated both in one part of the associated signal and in the other part or in both for the purpose of preventing one part from being stolen because the device will not work without said circuit 21 (see FIGS. 12, 14 and 15).

4.0.—Operation of the system, controller, programming, intercommunication, action sequence (see FIGS. 14 and 15).

Once said controller 320 receives a signal, it works by impulses with respect to time, activating or changing or modulating the on and off frequency of the outlet signals and in time intervals or sets of time; the signal received by said controller is from the switches-sensors of the handles of the door, or from the sensors-switches of the doors detecting their opening from barely open until fully open, or from the network of peripheral sensors of the vehicle, or from the intercommunication signal between vehicles by any means, and it can activate any automatic type function, such as aid in making decisions by means of the use of any type of presence sensor of the digital camera type which, by means of software, analyzes the images, infrared, radar emitter-receiver Hall-type magnetic sensor, or laser scanner; once the system is activated, they can detect a dangerous intrusion and approach in said dangerous passageway and perform an action consisting of:
Blocking the opening of the door for an instant, after which time it can be opened by pushing any additional unblock button.
Delaying same.
Altering with signals or a spoken message or signs, or a light indicator 52.
Activating a time set or interval of signals.
Blocking the lock and making said door open with a second movement on said handle, but in this case it is the passenger's responsibility, with the certainty that said passenger was alerted and it is the passenger who makes the decision to act.

The messages can be modified or re-recorded and the type of voice or message to be heard can be selected.

The signals, stimuli and locaters described above are associated with said electronic controller circuit 320 producing the open door signals, A1-OD, A2-OD, A-03-OD, A-04-OD, FL-OD, 3-0D, S-OD, or AH-OD and their variants according to the associated elements; it is enabled so as to preferably operate when the vehicle is stopped or traveling at a low speed, approximately less than 15 Km./h, with or without the engine running, with or without said side mirrors folded and with or without the contact key being operated, and it considers two situations and sequences:

A—The manual opening of the door from outside when getting in the vehicle.

B—The manual opening of the door from inside when getting out of the vehicle.

Sequence A, from outside:

1—The system is enabled so as to operate once the catches of the door of any type are released with the remote control, manually, with the key or by any type of recognition, card, numeric code or activation of a power or automatic door. Then said door P1 is enabled so as to allow pulling on its exterior handle He and getting in, unless it is a power door, in which case the process initiates prior to said power-operated movement of opening the door synchronized and associated with the contact ordering said action being activated.

2—Upon touching said exterior handle He and in the free movement MF or tolerance range before operating the lock 61 or by any type of sensor-switch-detector or switch in said handle, the controller 320 is activated, operating at least the first device D1 so that it emits the signal A in any of its variants and at least any version A2 is visible from behind 101*r* in said dangerous passageway 555, and the second device D2 so that it emits the signal FL optionally in conjunction with the external acoustic signal 70, all of them operating at a frequency that is different from the 1.5+2 Hz normally used in said turn signal, using a second "differential" open door warning function, preferably 10 Hz which is a faster frequency than said turn signal, thus achieving that the occupant or driver 202 of the vehicle is alert because the human eye perceives the turning on and off 10 times per second. Said activation is done by time interval or set of several second even though said handle He is released or it shuts off instantaneously when such handle is released.

3—The system can associate more signals, third or fourth devices D3 which can be one or several in number, such as the front signals 3 or the side signals S or their variants in location and for different situations, day or night, or signals of the side opening the vehicle door towards the front A-03, or rear A-04, applying the same "differential" frequency to all of them as the early open door warning, understanding this "differential" frequency as one which can range between zero and 18 Hz, above which frequency the difference between on and off is not perceived. It is understood that a Hertz is equivalent to one on and off cycle of the signal per second.

4—With the catches installed, said system does not work from the outside.

Sequence B, from the inside:

1—The sequence is initiated once the vehicle is stopped or is going at a low speed, whether or not the engine is running, whether or not the catches are released, whether or not the side mirrors are folded, the system alerts by means of the locater HL or light of the interior handle Hi, where said handle is located and by the color of its light or on frequency, which can be variable or fixed, as to the state of the catches of said door. Said locater HL can have associated therewith another locater in any part inside the vehicle, type 68L in the knob of the gear shift lever, or adjacent thereto 68La, or of the type 210L in the internal rearview mirror 210 or in the support thereof 212 or in any part visible by the eyes of the driver 202.

2—Once said handle Hi is touched and within the free movement MF—before operating or releasing the lock 61 the switch P1*s* of any type and associated with said handle, closes the contact and sends a signal to said controller 320 activating the associated devices D1 or D3 so that they emit the light signals which can be any of those of type A, 3 and S, or all of them, or at least type A signal in its version towards the rear A2 and its versions or any complementary signal in any part of the bodywork A-03, or A-04, or FL for a single side of the vehicle visible from behind or from the front in said dangerous side passageway 555 at the rear eye point 101*r* and front eye point 101*f*

3—The controller 320 activates any intrusion detection system.

4—The controller 320 activates a blinking sequence on at least one of said signals of point -2- together with the external acoustic signal 70, the internal acoustic signal 70*i* with any type of sound, spoken, polytonal warning, or for example the sentence "look backwards when getting out".

5—The controller activates the second device D2 at the same time so that it emits the signal FL and all or at least one of the signals of point -2- with a frequency "different" from the 1.5+2 Hz which normally operates said turn signal, and it uses as a second "differential" open door warning function for the same signal a process similar to that of point -2- of sequence A; preferably using 10 Hz which is a faster frequency than said turn signal, producing an alert and warned effect in the environment.

6—The system is activated for time intervals or "sets" of several seconds, said "sets" being reinitiated continuously and they continue operating, at least the last one, even though said handle Hi is released or it shuts off instantaneously when such handle is released. Said intervals can be adjustable.

7—In addition to producing warning signals, the system, independently of the sensors, is associated directly with the lock 61 and slows down the lock of said door for a time interval. This slowing is adjustable to a time interval of zero seconds. To immediately unlock, the movement of said handle must be repeated according to:

A—First movement or touch of said handle activates the system and keeps the open door warning signal OD and the system of external sensors active.

B—Second movement opens the door and the signal OD is maintained.

C—The locks of the doors do not open within the first range or set of signals or within a first instant of pushing said handle; to do so, the handle must remain pushed until the second set is activated or it must be pushed again, whichever occurs first.

8—When said controller activates the signals, the test locater light 51 is also activated in any of its versions, or its variant independent of the signal A, of an LED indicator 52; which indicates and is focused on the driver of the vehicle so that he/she can locate the plate glass 50 to look backwards before continuing to open the door.

In this range, if said sensors detect the presence or intrusion of a vehicle that is approaching in the dangerous side passageway 555, the controller 320 in its phase of processing the results of the sensor, and in response thereto, sends an aid signal for aiding the participating passengers of the type described above to block, delay the door or an acoustic and visual alert, for example a spoken message or alarm such as "Stop-danger", "Do not open-danger" "Danger-intrusion", "danger-wait"

The system is reset when said exterior handle He or interior handle Hi are released.

The system operates and controls the associated devices according to the operation by time intervals, said time intervals being one or at least one and being equal in time and functions or different from one another, adjustable and they can be continuously restarted.

In accordance with each of said intervals, the electronic controller 320 activates and keeps the same functions operating or makes variations upon adding or removing functions.

The system can be operated with a second range or set of signals which is added to the first range or set of signals; as a result of the impulse sent to the controller by the switch-detector-sensor 62 of the frame-door assembly FD-FC, independently of the action of the switch-detector P1s of the handle Hi of said door or of the group of said handle, or of any vehicle door, they open from outside or from inside said vehicle.

The range or set of signals is operated by the action of said detector-switch-sensor 62 of the frame of the door, independently of the action of the switch-detector P1s of the handle Hi of said door or of any vehicle door, they open from outside or inside said vehicle.

Independently of the early open door warning signal OD, the second sensor-detector-switch 62 in connection with the electronic controller circuit 320 and arranged in the automotive vehicle for detecting the opening of at least one of said doors is associated with the first external light device D1, or the internal locater lights located in the doors or their handles, or the associated external or internal sound indicators for indicating when a door is poorly closed.

The system is activated within the interval in which the interior or exterior handle of said doors is touched until said doors are completely open by means of the switch-sensor P1s of said handles Hi, He or by means of the detector-switch-sensor 62 of the frame or edge FD or of the frame-door assembly FD-FC of said doors.

The system is activated within the interval in which the detector-switch-sensor of the frame 62 of said doors detects that said doors are barely open until they are fully open.

The system uses a first detector-switch-sensor suitable for detecting and activating said open door warning system before, during or immediately after the opening thereof.

The elements associated with the system are integrated in several assemblies, said assemblies can be assembled in a vehicle as replacement assemblies for similar parts which do not produce said function OD, interior handle assembly with switch, locater light or acoustic signal, side mirror assembly with signals, plate glass-signal assembly, cover casing assembly with front or side location signal and/or front turn signal, controller of the system, cover casing assembly with front locater for daytime/night use.

A simplified system provided with at least a first light device D1 and a second light device D2 which can emit a type A signal in the side mirror or type A-03 or A-04, or type 3, or S or FL type, any of their variants located in a single side of a vehicle; associated with a switch P1s of any type, inside said vehicle which is activated when at least one of its passengers touches it, and an exclusive or shared associated controller of any type for the system, normally controlling other functions of the vehicle, such that it produces a different type of light emission of said signal, the frequency or intensity thereof being variable, and the same being visible from at least the rear eye point 101r and in the defined dangerous passageway 555, not escaping from the described concept early open door warning, is considered basic.

The functions carried out by said associated controller 320 can be shared, distributed or complemented with another controller of the vehicle or with a system of associated controllers interconnected by an intercommunication system or BUS, CAM language or the like, and/or carrying out part of the location-lighting or open door warning OD functions, and the analysis of stimuli of attached sensors and their respective response and/or they can share different functions outside the open door warning system OD.

A person skilled in the art may introduce changes and modifications in the embodiments described without departing from the scope of the invention as it is defined in the attached claims.

The invention claimed is:

1. An automotive vehicle early open door warning system, for preventing external collisions with pedestrians or vehicles traveling in a dangerous side passageway or adjacent side area parallel to the axis of travel of the automotive vehicle when the latter is stopped with or without the engine running, comprising:

a single light source arranged in a first external area of a side with respect to a vertical longitudinal mid-plane of said automotive vehicle and located in an external side mirror assembly, including at least one casing or cover casing, a frame casing and a plate glass-mirror assembly, for emitting at least one warning light signal to the front, rear and side of the vehicle, prior to the opening of a door of said side, visible from at least eye points located in a side passageway or side area adjacent to said vehicle, when said door is closed and with the side mirrors in a normal operating position and in a folded position;

said single light source easily visible by the driver with the side mirrors in the normal operating position and in the folded position;

at least one first sensor-detector-switch associated with an interior operating element used to open said door, said first sensor-detector-switch being suitable for detecting when said operating element, which is at least one of the group comprising the following operating elements: interior handle exterior handle, button, cable applying traction which operates the locks, lock-catch assembly, or a combination thereof, is operated in an initial phase and produces a signal or closes a contact; and an electronic controller circuit in connection with said first sensor-detector-switch with said single light source, said electronic controller circuit for controlling the single light source providing said warning light signal to the front, rear, and side of the vehicle so that it emits said warning light signal and for a simultaneous activation of said light indicator capturing the attention of the driver upon closing the contact or receiving a signal through the first sensing-detecting-switch device and even if no vehicle or cyclist is approaching, wherein light is provided through a light outlet conveying one part of the illumination of said single light source, so that at the same time part of the light is projected towards the rear and at the same time is visible by the driver eyes attracting the attention of the driver toward the mirror.

2. The system according to claim 1 wherein said single light source is a turn signal device operating with a different frequency from the periodic light signal indication to turn.

3. The system according to claim 1, wherein said single light source is provided by a turn signal device operating with a different frequency from the periodic light signal indication to turn.

4. The system according to claim 1 further comprising at least one second light device, arranged in a second area for at least one side of said automotive vehicle spaced from said first area, for emitting at least one warning light signal visible from any of said eye points located in said side passageway, said second light device being connected with said electronic controller circuit, for controlling said second light device so that it emits said warning light signal which is initiated right before and/or during the action of acting on the lock or catches of said door.

5. The system according to claim 4, wherein said warning light signal emitted by said second light device is visible when the door is not completely closed.

6. The system according to claim 4, further comprising a second sensor-detector-switch in connection with said electronic controller circuit and arranged in the automotive vehicle for detecting the opening of at least said door, the electronic controller circuit being suitable for making the second light device start to emit said warning light signal when said second sensor-detector-switch detects the opening or movement of the door.

7. The system according to claim 4, wherein said second area forms part of an edge of the door or of an internal area of the door, or of said external side of the automotive vehicle which is visible from behind, such as the warning light signal (FL-OD) emitted by the second light device, when the door is open within a range of angular positions, which includes the positions of the door when the latter blocks vision from behind of the light signal emitted towards the rear by the single light source.

8. The system according to claim 1, wherein one of said warning light signals emitted by said single light source and visible from said rear eye points located in said side passageway is provided by a module or light outlet of independent construction with respect to another source of said light signals emitted by the single light source, but associated in operation therewith, said module visible from behind being isolated since it is located in at least one of the following parts of said external side mirror assembly:

in the frame-casing, in which case it emits a light signal visible from behind, in a position of the frame-casing below the plane of the plate glass-mirror assembly, in which case it emits a light signal visible from behind, in the plate glass-mirror assembly or thereunder, in which case it emits a light signal visible from behind, in the edge of the plate glass-mirror assembly, in which case it emits a light signal visible from behind, and in a complementary optical light outlet towards the rear located in the frame of the casing or in the frame of the plate glass using the same light source of said light signal emitted by the single light source, said optical light outlet being visible by the eyes of the driver with the function of serving to locate the plate glass-mirror assembly upon activating the system.

9. The system according to claim 1, further comprising at least one external sensor system in connection with said electronic controller circuit, or another controller associated therewith in a network, suitable for detecting the Intrusion and the approach of vehicles in said dangerous side passageway, based on the reflection of radio waves or radar, ultrasound, digital camera with an interface that analyzes images, infra red emitter-receiver, or Hall-type magnetic sensors, or laser scanner, which are activated together with the system for emitting, as a response, a sound or visual alert, or blocking for an instant or delaying the opening of the door when said open door warning system Is activated from inside the vehicle.

10. The system according to claim 4, wherein said electronic controller circuit or other associated controller is suitable for controlling, in addition to said second light device, a third light device which is arranged in the knob of the gear shift lever and or in the frame adjacent to said lever and or In the internal rearview mirror and/or in the support of said internal rearview mirror, or in any command display, which commands are perceived from the position of the driver, so that it emits the respective light signal as an indicator of the locked or unlocked state of the locks, related to the speed or stopped state of the vehicle, or state of its locks and of the response to external sensors or intercommunication between vehicles.

11. The system according to claim 1, further comprising an internal acoustic warning device arranged in the interior of the vehicle, and in connection with at least said electronic controller circuit or integrated in said circuit controller or said interior handle such that they form an assembly associated and or in connection with internal equipment of the automotive vehicle which reproduces sound, suitable for emitting an acoustic warning or a message with a predetermined frequency, formed by sounds or a modifiable recordable spoken message simultaneously with said first warning light signal activation.

12. An automotive vehicle early open door warning system, for preventing external collisions with pedestrians or vehicles traveling in a dangerous side passageway or adjacent side area parallel to the axis of travel of the vehicle or when the latter is stopped with or without the engine running, comprising:

a single light source arranged in a first external area of a side with respect to a vertical longitudinal mid-plane of said automotive vehicle and located in an external side mirror assembly, including at least one casing or cover casing, a frame casing and a plate glass-mirror assembly, for emitting at least one first warning light signal to the front, rear and side of the vehicle, prior to the opening of a door of said side, visible from at least eye points located in a side passageway or side area adjacent to said vehicle, when said door is closed and with the side mirrors in a normal operating position and in a folded position;

said single light source is located in an external side mirror assembly, including at least one casing or cover casing, a frame casing, a plate glass-mirror assembly thereof which connects it to the bodywork, an internal acoustic warning device arranged in the interior of the vehicle;

at least one first sensor-detector-switch associated with an interior operating element used to open said door, said first sensor-detector-switch for detecting when said operating element, which is at least one of the group comprising the following operating elements:

interior handle exterior handle, button, cable applying traction which operates the locks, lock-catch assembly, or a combination thereof, is operated in an initial phase and produces a signal or closes a contact; and an electronic controller circuit in connection with said first sensor-detector-switch with said single light source and with said internal acoustic warning device, said electronic controller circuit for controlling the single light source so that it emits said warning light signal and for simultaneous activation of said internal acoustic warning device arranged upon closing the contact or receiving a signal through the first sensing-detecting-switch device, wherein light is provided through a light outlet in the frame of said side mirror conveying one part of the illumination of said single light source, so that at the same time part of the light is projected towards the rear and at the same time is visible by the driver eyes attracting the attention of the driver toward the mirror.

13. The system according to claim 9, wherein the electronic controller circuit is suitable for reacting to the stimulus of said external sensors performing individual or combined operations while at the same time it keeps the single light source operating according to said open door early warning function, said individual or combined operations being the following:
  A. blocking the opening of the door, after which time it can be opened by pushing any additional unblock button, or operating again;
  B. delaying the opening of the door an instant;
  C. alerting with light or acoustic signals of a dangerous situation by means of a spoken message signs, or written In the display of the instruments-or by a light indicator, or using the light signal acting as an internal locater of the handle, or the light signals in the gear shift lever or in the adjacent frame, or in the internal rearview mirror or any other internal acoustic or visual signal that can be perceived as a stimulus-warning by the passengers or driver of said vehicle; and
  D. varying the frequency of the external or internal open door light or sound signal.

14. The system according to claim 1, wherein said operating element is an exterior element or an element that can be activated from outside the vehicle, the system being enabled to operate when the operating element has been activated from outside by a user when getting in the automotive vehicle, and once the catches of its doors have been released.

15. The system according to claim 10, wherein the electronic controller circuit is suitable for activating at least one of said single light source and or other devices for carrying out equal or different functions, according to an operation by time intervals, said time intervals being at least one and being equal in time or different from one another, adjustable and able to be continuously restarted.

16. The system according to claim 9, wherein said electronic controller circuit is suitable for activating and keeping the open door warning signals and said external sensors operating upon the first movement of said interior handle and upon repeating said movement of the interior handle opening the lock associated in operation and keeping the open door warning signals operating.

17. The system according to claim 6, wherein said second sensor-detector-switch is also associated with several internal locater lights located in the doors, their handles, or in a location visible to the eyes of the driver, or associated with external light signal devices of the system with external sound indicators or internal sound Indicators to indicate when a door is poorly closed and which is at least perceived from outside said vehicle.

18. The system according to claim 1, wherein the elements forming the system are assembled in an automotive vehicle as replacement assemblies to replace similar parts which cannot produce nor be associated in operation with said open door warning function, or as integrated assemblies of series sharing parts such as their circuit interface, wiring, connector, or support-structure and are:
  interior handle with switch-sensor,
  side mirror assembly with signals,
  plate glass-signal assembly,
  plate glass-signal-antenna assembly,
  cover casing assembly with location signal device and/or turn front signal device,
  cover casing assembly with front light locater for daytime/nighttime use,
  second sensor-detector-switch assembly integrated in a module with second light emitter device emitting a warning signal, or structure, said module arranged being in said second area forming part of said edge of the door, or
  being integrated in said assemblies with an electronic controller circuit which operates the system.

* * * * *